United States Patent
Ly et al.

(10) Patent No.: US 11,930,451 B2
(45) Date of Patent: Mar. 12, 2024

(54) TECHNIQUES FOR WIRELESS COMMUNICATION IN CONNECTED DISCONTINUOUS RECEPTION MODE

(71) Applicant: QUALCOMM Incorporated, San Diego, CA (US)

(72) Inventors: Hung Dinh Ly, San Diego, CA (US); Huilin Xu, Temecula, CA (US); Muhammad Sayed Khairy Abdelghaffar, San Jose, CA (US); Hwan Joon Kwon, San Diego, CA (US); Krishna Kiran Mukkavilli, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 272 days.

(21) Appl. No.: 17/367,091

(22) Filed: Jul. 2, 2021

(65) Prior Publication Data
US 2023/0007587 A1    Jan. 5, 2023

(51) Int. Cl.
*H04W 52/02* (2009.01)
*H04L 5/00* (2006.01)
(Continued)

(52) U.S. Cl.
CPC ....... *H04W 52/0219* (2013.01); *H04L 5/0042* (2013.01); *H04W 52/0206* (2013.01);
(Continued)

(58) Field of Classification Search
CPC ......... H04W 52/0216; H04W 52/0219; H04W 52/0206; H04W 72/02; H04W 72/23;
(Continued)

(56) References Cited

U.S. PATENT DOCUMENTS

2017/0289968 A1* 10/2017 Marco ............... H04W 72/1268
2018/0255607 A1*  9/2018 Nagaraja ............... H04L 5/0053
(Continued)

FOREIGN PATENT DOCUMENTS

WO    WO-2021087823 A1 *  5/2021    ............ H04W 76/28

OTHER PUBLICATIONS

3GPP TF 23.776: "3rd Generation Partnership Project, Technical Specification Group Services and System Aspects, Study on Architecture Enhancements for 3GPP Support of Advanced Vehicle-to-Everything (V2X) Services, Phase 2 (Release 17)", 3GPP, Mobile Competence Centre, 650, Route Des Lucioles, F-06921 Sophia-Antipolis, Cedex, France, vol. SA WG2, No. V17.0.0, Mar. 31, 2021, pp. 1-29, XP052000264, Sections 5, 6, 7, see clauses 6.2.2, 6.5.1-6.5.2.
(Continued)

*Primary Examiner* — Chi H Pham
*Assistant Examiner* — Vladislav Y Agureyev
(74) *Attorney, Agent, or Firm* — Holland & Hart LLP

(57) ABSTRACT

Methods, systems, and devices for wireless communication are described. A user equipment (UE) may receive, from a base station, control signaling indicating a set of connected discontinuous reception (C-DRX) configurations. The set of C-DRX configurations may include a first C-DRX configuration and a second C-DRX configuration, where at least one C-DRX configuration in the set of C-DRX configurations is a UE-group common C-DRX configuration. The set of C-DRX configurations may correspond to a discontinuous transmission (DTX) cycle of the base station. The UE may select a C-DRX configuration from the set of C-DRX configurations based on receiving the control signaling from the base station. Accordingly, the UE may use the selected C-DRX configuration to communicate with the base station. The selected C-DRX configuration may enable the base
(Continued)

station to operate with reduced power consumption and higher DTX efficiency, among other benefits.

30 Claims, 16 Drawing Sheets

(51) Int. Cl.
*H04W 72/02* (2009.01)
*H04W 72/23* (2023.01)
*H04W 72/51* (2023.01)

(52) U.S. Cl.
CPC .......... *H04W 72/02* (2013.01); *H04W 72/23* (2023.01); *H04W 72/51* (2023.01)

(58) Field of Classification Search
CPC .... H04W 72/51; H04W 76/28; H04L 5/0042; Y02D 30/70
See application file for complete search history.

(56) References Cited

U.S. PATENT DOCUMENTS

| | | | |
|---|---|---|---|
| 2019/0059129 A1* | 2/2019 | Luo | H04W 52/0216 |
| 2019/0387572 A1* | 12/2019 | Nam | H04W 52/0235 |
| 2020/0100179 A1 | 3/2020 | Zhou et al. | |
| 2020/0112941 A1* | 4/2020 | Yerramalli | H04W 28/04 |
| 2020/0154355 A1* | 5/2020 | Nam | H04W 52/0216 |
| 2021/0259044 A1* | 8/2021 | Islam | H04W 52/0229 |
| 2022/0256625 A1* | 8/2022 | Park | H04W 76/40 |
| 2022/0312326 A1* | 9/2022 | Wu | H04W 76/28 |
| 2022/0400531 A1* | 12/2022 | Back | H04W 76/28 |
| 2022/0408511 A1* | 12/2022 | Dong | H04W 76/28 |
| 2023/0156858 A1* | 5/2023 | Freda | H04W 76/28 370/329 |

OTHER PUBLICATIONS

Apple: "Discussion on Sidelink DRX", 3GPP TSG-RAN WG2 Meeting #112e, R2-2009527, 3rd Generation Partnership Project, Mobile Competence Centre, 650, Route Des Lucioles, F-06921, Sophia-Antipolis Cedex, France, vol. RAN WG2, No. Online, Nov. 2, 2020-Nov. 13, 2020, Oct. 23, 2020, XP051942479, pp. 1-5, sections 2.1-2.3, the whole document.
ASUSTEK: "Discussion on Sidelink DRX", 3GPP TSG-RAN WG2 Meeting #113 electronic, R2-2101756, 3rd Generation Partnership Project, Mobile Competence Centre, 650, Route Des Lucioles, F-06921 Sophia-Antipolis Cedex, France, vol. RAN WG2, No. electronic, Jan. 25, 2021-Feb. 5, 2021, 4 Pages, Jan. 15, 2021, XP051974621, section 2.
International Search Report and Written Opinion—PCT/US2022/029666—ISA/EPO—dated Sep. 16, 2022.

* cited by examiner

TECHNIQUES FOR WIRELESS COMMUNICATION IN CONNECTED DISCONTINUOUS RECEPTION MODE

FIELD OF TECHNOLOGY

The following relates to wireless communication, including techniques for wireless communication in connected discontinuous reception (C-DRX) mode.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for wireless communication in C-DRX mode. Generally, the described techniques provide for a base station configuring a group of UEs with a UE-group common C-DRX configuration. The base station may indicate a set of UE-group common C-DRX configurations to the group of UE via control signaling, such as radio resource control (RRC), downlink control information (DCI), or medium access control-control element (MAC-CE). A UE of the group of UE may select a UE-group common C-DRX configuration from the indicated set of UE-group common C-DRX configurations. The UE may use the selected UE-group common C-DRX configuration to perform wireless communications with the base station. By configuring the group of UE with a UE-group common C-DRX configuration, a respective UE of the group of UE may enable the base station to operate with reduced power consumption, among other benefits.

A method for wireless communication at a UE is described. The method may include receiving, from a base station, control signaling indicating a set of C-DRX configurations including a first C-DRX configuration and a second C-DRX configuration, where at least one C-DRX configuration of the set of C-DRX configurations includes a UE-group common C-DRX configuration, selecting a C-DRX configuration from the set of C-DRX configurations based on receiving the control signaling, and performing the wireless communication based on the selected C-DRX configuration.

An apparatus for wireless communication at a UE is described. The apparatus may include a processor, memory coupled with the processor, and instructions stored in the memory. The instructions may be executable by the processor to cause the apparatus to receive, from a base station, control signaling indicating a set of C-DRX configurations including a first C-DRX configuration and a second C-DRX configuration, where at least one C-DRX configuration of the set of C-DRX configurations includes a UE-group common C-DRX configuration, select a C-DRX configuration from the set of C-DRX configurations based on receiving the control signaling, and perform the wireless communication based on the selected C-DRX configuration.

Another apparatus for wireless communication at a UE is described. The apparatus may include means for receiving, from a base station, control signaling indicating a set of C-DRX configurations including a first C-DRX configuration and a second C-DRX configuration, where at least one C-DRX configuration of the set of C-DRX configurations includes a UE-group common C-DRX configuration, means for selecting a C-DRX configuration from the set of C-DRX configurations based on receiving the control signaling, and means for performing the wireless communication based on the selected C-DRX configuration.

A non-transitory computer-readable medium storing code for wireless communication at a UE is described. The code may include instructions executable by a processor to receive, from a base station, control signaling indicating a set of C-DRX configurations including a first C-DRX configuration and a second C-DRX configuration, where at least one C-DRX configuration of the set of C-DRX configurations includes a UE-group common C-DRX configuration, select a C-DRX configuration from the set of C-DRX configurations based on receiving the control signaling, and perform the wireless communication based on the selected C-DRX configuration.

Some examples of the method, apparatuses, and non-transitory computer-readable medium described herein may further include operations, features, means, or instructions for transmitting information associated with a capability of the UE to select between different C-DRX configurations and where receiving the control signaling may be based on transmitting the information.

Some examples of the method, apparatuses, and non-transitory computer-readable medium described herein may further include operations, features, means, or instructions for receiving an indication of the C-DRX configuration from the set of C-DRX configurations for use by the UE and where selecting the C-DRX configuration from the set of C-DRX configurations may be based on receiving the indication.

In some examples of the method, apparatuses, and non-transitory computer-readable medium described herein, receiving the indication may include operations, features, means, or instructions for receiving DCI that includes the indication, where the DCI includes a UE-group DCI.

In some examples of the method, apparatuses, and non-transitory computer-readable medium described herein, the DCI includes timing information indicating a period between receiving the DCI and enabling the C-DRX configuration.

In some examples of the method, apparatuses, and non-transitory computer-readable medium described herein, receiving the indication may include operations, features, means, or instructions for receiving a MAC-CE that includes the indication.

In some examples of the method, apparatuses, and non-transitory computer-readable medium described herein, the MAC-CE includes timing information indicating a period between receiving DCI and enabling the C-DRX configuration.

Some examples of the method, apparatuses, and non-transitory computer-readable medium described herein may further include operations, features, means, or instructions for switching from a default C-DRX configuration to the selected C-DRX configuration based on receiving the indication and where performing the wireless communication may be based on switching from the default C-DRX configuration to the selected C-DRX configuration.

In some examples of the method, apparatuses, and non-transitory computer-readable medium described herein, the default C-DRX configuration includes a UE-specific C-DRX configuration and the selected C-DRX configuration includes a UE-group common C-DRX configuration.

In some examples of the method, apparatuses, and non-transitory computer-readable medium described herein, the default C-DRX configuration corresponds to a normal operating mode of the base station or a power saving mode of the base station.

In some examples of the method, apparatuses, and non-transitory computer-readable medium described herein, the default C-DRX configuration may be associated with a unique identifier.

Some examples of the method, apparatuses, and non-transitory computer-readable medium described herein may further include operations, features, means, or instructions for enabling a power saving mode based on the selected C-DRX configuration including a UE-group common C-DRX configuration and where performing the wireless communication may be based on enabling the power saving mode.

In some examples of the method, apparatuses, and non-transitory computer-readable medium described herein, receiving the control signaling may include operations, features, means, or instructions for receiving an RRC message indicating the set of C-DRX configurations and where the set of C-DRX configurations includes a set of multiple UE-group common C-DRX configurations.

In some examples of the method, apparatuses, and non-transitory computer-readable medium described herein, each UE-group common C-DRX configuration of the set of multiple UE-group common C-DRX configurations corresponds to a separate power mode.

In some examples of the method, apparatuses, and non-transitory computer-readable medium described herein, the first C-DRX configuration includes a UE-specific discontinuous reception configuration and the second C-DRX configuration includes the UE-group common C-DRX configuration.

A method for wireless communication at a base station is described. The method may include transmitting, to a UE, control signaling indicating a set of C-DRX configurations including a first C-DRX configuration and a second C-DRX configuration, where at least one C-DRX configuration of the set of C-DRX configurations includes a UE-group common C-DRX configuration, selecting a C-DRX configuration from the set of C-DRX configurations based on transmitting the control signaling, and performing the wireless communication based on the selected C-DRX configuration.

An apparatus for wireless communication at a base station is described. The apparatus may include a processor, memory coupled with the processor, and instructions stored in the memory. The instructions may be executable by the processor to cause the apparatus to transmit, to a UE, control signaling indicating a set of C-DRX configurations including a first C-DRX configuration and a second C-DRX configuration, where at least one C-DRX configuration of the set of C-DRX configurations includes a UE-group common C-DRX configuration, select a C-DRX configuration from the set of C-DRX configurations based on transmitting the control signaling, and perform the wireless communication based on the selected C-DRX configuration.

Another apparatus for wireless communication at a base station is described. The apparatus may include means for transmitting, to a UE, control signaling indicating a set of C-DRX configurations including a first C-DRX configuration and a second C-DRX configuration, where at least one C-DRX configuration of the set of C-DRX configurations includes a UE-group common C-DRX configuration, means for selecting a C-DRX configuration from the set of C-DRX configurations based on transmitting the control signaling, and means for performing the wireless communication based on the selected C-DRX configuration.

A non-transitory computer-readable medium storing code for wireless communication at a base station is described. The code may include instructions executable by a processor to transmit, to a UE, control signaling indicating a set of C-DRX configurations including a first C-DRX configuration and a second C-DRX configuration, where at least one C-DRX configuration of the set of C-DRX configurations includes a UE-group common C-DRX configuration, select a C-DRX configuration from the set of C-DRX configurations based on transmitting the control signaling, and perform the wireless communication based on the selected C-DRX configuration.

Some examples of the method, apparatuses, and non-transitory computer-readable medium described herein may further include operations, features, means, or instructions for transmitting information associated with a capability of the UE to select between different C-DRX configurations and where transmitting the control signaling may be based on transmitting the information.

Some examples of the method, apparatuses, and non-transitory computer-readable medium described herein may further include operations, features, means, or instructions for transmitting an indication of the C-DRX configuration of the set of C-DRX configurations for use by the UE.

In some examples of the method, apparatuses, and non-transitory computer-readable medium described herein, transmitting the indication may include operations, features, means, or instructions for transmitting DCI that includes the indication, where the DCI includes a UE-group DCI.

In some examples of the method, apparatuses, and non-transitory computer-readable medium described herein, the DCI includes timing information indicating a period between transmitting the DCI and enabling the C-DRX configuration.

In some examples of the method, apparatuses, and non-transitory computer-readable medium described herein, transmitting the indication may include operations, features, means, or instructions for transmitting a MAC-CE that includes the indication.

In some examples of the method, apparatuses, and non-transitory computer-readable medium described herein, the MAC-CE includes timing information indicating a period between transmitting DCI and enabling the C-DRX configuration.

Some examples of the method, apparatuses, and non-transitory computer-readable medium described herein may further include operations, features, means, or instructions for switching from a default C-DRX configuration to the selected C-DRX configuration based on transmitting the indication and where performing the wireless communication may be based on switching from the default C-DRX configuration to the selected C-DRX configuration.

In some examples of the method, apparatuses, and non-transitory computer-readable medium described herein, the default C-DRX configuration includes a UE-specific C-DRX configuration and the selected C-DRX configuration includes a UE-group common C-DRX configuration.

Some examples of the method, apparatuses, and non-transitory computer-readable medium described herein may further include operations, features, means, or instructions for enabling a power saving mode based on the selected C-DRX configuration including a UE-group common C-DRX configuration and where performing the wireless communication may be based on enabling the power saving mode.

In some examples of the method, apparatuses, and non-transitory computer-readable medium described herein, transmitting the control signaling may include operations, features, means, or instructions for transmitting an RRC message indicating the set of C-DRX configurations and where the set of C-DRX configurations includes a set of multiple UE-group common C-DRX configurations.

In some examples of the method, apparatuses, and non-transitory computer-readable medium described herein, each UE-group common C-DRX configuration of the set of multiple UE-group common C-DRX configurations corresponds to a separate power mode.

In some examples of the method, apparatuses, and non-transitory computer-readable medium described herein, the first C-DRX configuration includes a UE-specific discontinuous reception configuration and the second C-DRX configuration includes the UE-group common C-DRX configuration.

DETAILED DESCRIPTION

Figure 1:
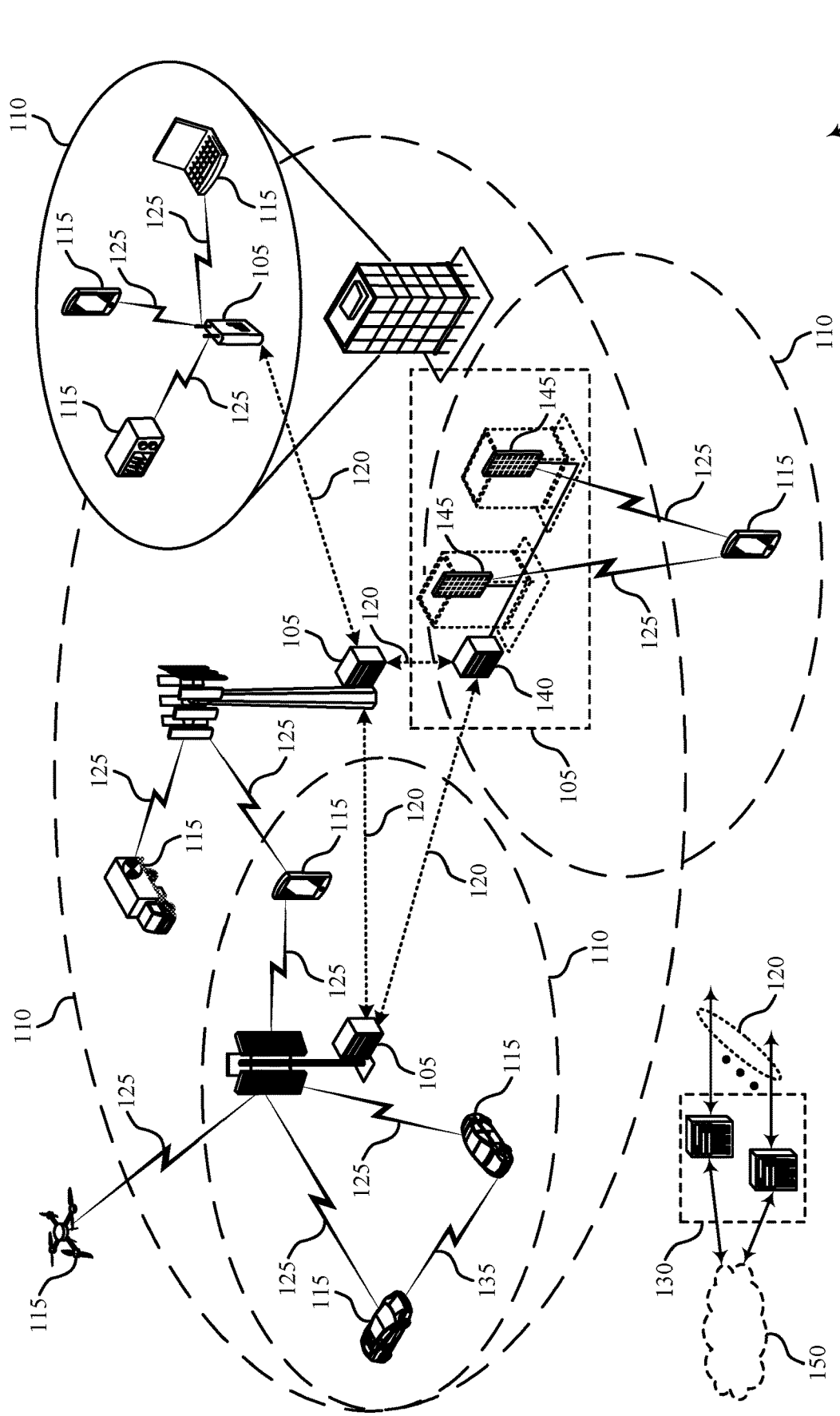
FIGS. 1 and 2 illustrate examples of wireless communications systems that support techniques for wireless communication in C-DRX mode in accordance with aspects of the present disclosure.

A wireless communications system may include communication devices, such as a UE or a base station (e.g., an eNodeB (eNB), a next-generation NodeB or a giga-NodeB, any of which may be referred to as a gNB, or some other base station), and may support multiple radio access technologies. Examples of radio access technologies include 4G systems, such as LTE systems, and 5G systems, which may be referred to as NR systems. In some cases, the wireless communications system may support bandwidths, data rates, and multiplexing schemes that may be associated with high power consumption. To reduce the power consumption in the wireless communications system, a communication device may enter a discontinuous reception (DRX) cycle or a discontinuous transmission (DTX) cycle. A communication device in a DRX cycle may periodically switch between an active reception mode (e.g., in which the communication device monitors for transmissions from other communication devices) and an inactive reception mode (in which the communication device enters a sleep mode). Likewise, a communication device in a DTX cycle may periodically switch between an active transmission mode (in which the communication device may transmit messages to other communication devices) and an inactive transmission mode (in which the communication device enters a sleep mode).

A communication device that remains in an inactive mode (e.g., a sleep mode) for an extended duration may experience greater power savings. However, a communication device in an inactive reception mode may be scheduled to receive a message, which may prevent the communication device from remaining in the inactive mode for an extended duration. Additionally or alternatively, a communication device may be configured to remain in an active reception mode after receiving a message, which may inhibit the period that the communication can spend in an inactive mode. Similarly, a communication device in an inactive mode may be scheduled to transmit a message during an inactive period or may be configured to remain in an active transmission mode after transmitting a message. In such cases, the communication devices may spend less time in an inactive mode and may experience less power savings.

In accordance with the techniques described herein, a communication device (e.g., a base station) may configure one or more other communication devices (e.g., UEs) in a network with a UE-group common C-DRX configuration such that the communication device can remain in an inactive mode for an extended duration (e.g., when the communication device is in a DTX cycle). The UE-group common C-DRX configuration may align active durations of the other communication devices (e.g., durations in which the other communication devices are in an active reception mode) by setting a timing parameter to a common value. Aligning the active durations of the other communication devices (e.g., UEs) may reduce a number of frames in which the communication device (e.g., base station) is in an active transmission mode, which may result in greater power savings and reduced network power consumption, among other benefits.

The communication device (e.g., base station) may configure the other communication devices with multiple UE-group common C-DRX configurations via control signaling, such as RRC, DCI, or MAC-CE. These communication devices may select one of the multiple UE-group common C-DRX configurations based on receiving the control signaling and may use the selected UE-group common C-DRX configuration to perform wireless communications with the communication device (e.g., base station). Additionally or alternatively, the communication device may configure the other communication devices with various network power saving features associated with the multiple UE-group common C-DRX configurations. These communication devices may enable the network power saving features when using a UE-group common C-DRX configuration to communicate with the communication device (e.g., base station).

Aspects of the present disclosure may be implemented to realize one or more of the following advantages. The described techniques may provide for reduced network power consumption based on a communication device (e.g., a base station) configuring one or more other communication devices (e.g., UEs) with a UE-group common C-DRX configuration. Configuring the one or more communication devices with a UE-group common C-DRX configuration may enable the communication device (e.g., base station) to remain in an inactive mode (e.g., a low-power mode) for an extended duration by increasing a number of frames in which the communication device can remain in an inactive mode. As a result, the communication device may remain in sleep mode longer and may experience greater power savings, among other benefits.

Aspects of the disclosure are initially described in the context of wireless communications systems, a communications scheme, and a process flow. Aspects of the disclosure are further illustrated by and described with reference to apparatus diagrams, system diagrams, and flowcharts that relate to techniques for wireless communication in C-DRX mode.

FIG. 1 illustrates an example of a wireless communications system 100 that supports techniques for wireless communication in C-DRX mode in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNB, a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications systems 100 may support communications between a base station 105 and one or more UEs 115. In some cases, the base station 105 may use a bandwidth, a number of radio frequency spectrum bands, and a number of active antenna units (AAUs), baseband units (BBUs), or remote radio units (RRUs) to communicate with the one or more UEs 115, which may result in increased power consumption at the base station 105 (e.g., in comparison to 4G networks). This increased power consumption may lead to higher carbon emissions and increased operational expenditures (e.g., for operators of the cellular network).

A base station 105 may enter a DTX mode to conserve power. While in the DTX mode (e.g., cell DTX), the base station 105 may periodically switch between an active transmission mode (e.g., in which the base station 105 may transmit messages) and an inactive transmission mode (e.g., in which the base station 105 enters a sleep mode). The base station 105 may switch from the active transmission mode to the inactive transmission mode based on a DTX configuration of the base station 105. Additionally or alternatively, one or more UEs 115 may enter a DRX mode or a C-DRX mode (e.g., UE C-DRX) to conserve power. While in a DRX mode or a C-DRX mode, a UE 115 may switch between an active reception mode (e.g., in which the UE 115 monitors a physical downlink control channel (PDCCH) for transmissions) and an inactive reception mode (e.g., in which the UE 115 enters a sleep mode). In a C-DRX mode, the UE 115 may be in a connected mode (e.g., an RRC_CONNECTED) with respect to the base station 105. In a DRX mode, the UE 115 may be in an idle mode (e.g., RRC_IDLE) or an inactive mode (e.g., RRC_INACTIVE) with respect to the base station 105.

The one or more UEs 115 may switch between the active reception mode and the inactive reception mode based on a set of DRX parameters, which may include an active duration, an inactivity timer, a cycle duration, and an offset value. The active duration may refer to a time duration in which a UE 115 is configured to monitor a PDCCH for transmissions from the base station 105. The inactivity timer may refer to a time duration in which the UE 115 is configured to remain in an active reception mode after receiving a PDCCH transmission from the base station 105. The cycle duration may refer to a time interval between active durations (e.g., a periodicity of active durations). The offset value may refer to a time interval between the start of a scheduling unit (e.g., slot, subframe, frame) and the start of an active duration. If the UE 115 is not in an active duration and the UE 115 has not received a PDCCH transmission in a time duration corresponding to the inactivity timer (e.g., if the inactivity timer has expired), the UE 115 may enter an inactive mode until the next active duration or until the UE 115 is scheduled to receive a transmission. In some examples, the base station 105 may indicate these DRX parameters to the UE 115 via control signaling (e.g., RRC signaling).

In some cases, the one or more UEs 115 may be scheduled to receive transmissions outside of an active duration (e.g., outside of DRX active time). For example, a UE 115 may be configured to receive a radio resource management (RRM) message, a radio link management (RLM) message, system information (SI), or a semi-persistent scheduled (SPS) physical downlink shared channel (PDSCH) transmission. In other cases, the UE 115 may receive a dynamic grant (e.g., in a PDCCH transmission) that schedules a PDSCH transmission during an inactive duration of the UE 115. In such cases, the UE 115 may switch from an inactive reception mode (e.g., a sleep mode) to an active reception mode to receive these transmissions, which may impact power savings at the UE 115.

The base station 105 and the one or more UEs 115 may experience power savings when active reception modes of the one or more UEs 115 overlap with active transmission modes of the base station 105. That is, cell DTX may be correlated with UE C-DRX. The base station 105 may also experience power savings and DTX efficiency when a traffic load of the network is lower because the likelihood of the base station 105 having empty frames (e.g., frames in which the base station 105 is not scheduled to transmit messages) may be higher. In contrast, the base station 105 and the one or more UEs 115 may experience reduced power savings when active reception modes of the one or more UEs 115 and active transmission modes of the base station 105 are misaligned (e.g., do not overlap in the time domain) or if the traffic load of the network is high (e.g., above a threshold).

To increase the likelihood of overlap between active transmission modes of the base station 105 and active reception modes of the one or more UEs 115, the base station 105 may attempt to align downlink transmissions with the active reception modes of the one or more UEs 115. In some cases, the base station 105 may be unable to align some cell-specific transmissions (e.g., RRM messages or SI) with the active reception modes of the one or more UEs 115. In other cases, the base station 105 may attempt to align uplink transmissions from the one or more UEs 115 based on setting a DRX inactivity timer of the one or more UEs 115 to a common value (e.g., 0) and aligning active reception periods (e.g., ON durations) for the one or more UEs 115. However, the base station 105 may be able to adjust these parameters during an RRC configuration.

The base station 105 may also increase the likelihood of overlap between active durations of the base station 105 and active durations of the one or more UEs 115 by indicating, to the one or more UEs 115, a DTX configuration of the base station 105. In such cases, the one or more UEs 115 may perform PDCCH monitoring during time periods in which active transmission modes of the base station 105 overlap with active reception modes of the one or more UEs 115. In other cases, the base station 105 may align active DRX periods of the one or more UEs 115 with active DTX periods of the base station 105 (e.g., without indicating a DTX configuration of the base station 105) based on scheduling broadcast transmissions (e.g., synchronization signal blocks (SSBs), random access channel (RACH) messages, paging messages, and SI) and downlink transmissions on similar time resources (e.g., in the same slots). That is, the base station 105 may implement DTX with improved efficiency by concentrating downlink transmissions around broadcast slots and leaving other slots empty. In some cases, the one or more UEs 115 may be configured with different DRX configurations that reduce the likelihood of alignment between cell DTX and UE C-DRX. That is, an active duration of a first UE 115 may not align with an active duration of a second UE 115. As such, the base station 105 may be unable to align active reception modes of the one or more UEs 115 with active transmission modes of the base station 105, which may reduce DTX efficiency at the base station 105.

In the wireless communications system 100, the base station 105 may improve network energy efficiency (e.g., NR power efficiency) and reduce network power consumption (e.g., NR power consumption) based on configuring the one or more UEs 115 with a UE-group common C-DRX configuration. The UE-group common C-DRX configuration may align active durations of the one or more UEs 115 by setting a DRX inactivity timer of the one or more UEs 115 to a common value (e.g., 0). However, unlike other C-DRX configurations, the base station 105 may configure or adjust the UE-group common C-DRX configuration of the UEs 115 via dynamic signaling (e.g., DCI or a MAC-CE), which may enable the base station 105 to adapt the UE-group common C-DRX configuration of the UEs 115 based on a DTX configuration of the base station 105. Thus, configuring the one or more UEs 115 with the UE-group common C-DRX configuration may increase alignment between active durations of the base station 105 and active durations of the one or more UEs 115, which may improve power savings and DTX efficiency at the base station 105, among other benefits.

Figure 2:
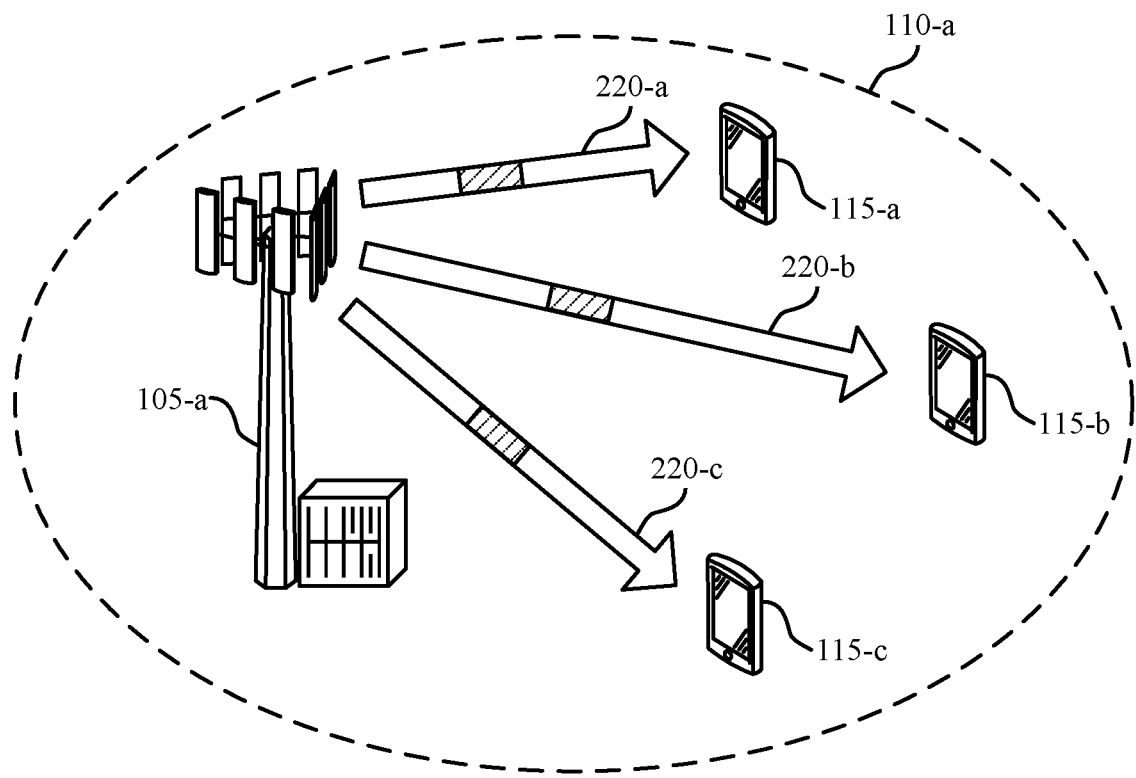

FIG. 2 illustrates an example of a wireless communications system 200 that supports techniques for wireless communication in C-DRX mode in accordance with aspects of the present disclosure. The wireless communications system 200 may implement or be implemented by aspects of the wireless communications system 100. For example, the wireless communications system 200 may include a base station 105-a, a UE 115-a, a UE 115-b, and a UE 115-c, which may be examples of corresponding devices described with reference to FIG. 1. The base station 105-a may communicate with the UEs 115 in a geographic coverage area 110-a, which may be an example of a geographic coverage area 110 described with reference to FIG. 1.

The base station 105-a may configure the UEs 115 with UE-specific C-DRX configurations. For example, the base station 105-a may configure the UE 115-a with a first UE-specific C-DRX configuration over a communication link 220-a, may configure the UE 115-b with a second UE-specific C-DRX configuration over a communication link 220-b, and may configure the UE 115-c with a third UE-specific C-DRX configuration over a communication link 220-c. The UE-specific C-DRX configurations may enable the UEs 115 to consume less power by operating in a sleep mode (e.g., a low-power mode) during periods of inactivity (as described with reference to FIG. 1). Similarly, the base station 105-a may be configured with a DTX configuration that enables the base station 105-a to conserve power by operating in a sleep mode during inactive periods.

The UE-specific C-DRX configurations may specify active durations in which the UEs 115 are configured to wake up from a sleep mode and check for PDCCH transmissions from the base station 105-a. Likewise, the DTX configuration may specify active durations in which the base station 105-a is configured to wake up from a sleep mode to transmit messages (e.g., PDCCH transmissions) to the UEs 115. The base station 105-a may experience improved power savings if active durations of the UEs 115 overlap in the time domain (e.g., if the UEs 115 are active at the same time). In some cases, the UEs 115 may be configured with different UE-specific C-DRX configurations such that the UEs 115 are active at different times, which may impact power savings at the base station 105-a.

The base station 105-a may align the active durations of the UEs 115 by configuring the UEs 115 with the same UE-specific C-DRX configuration. That is, the base station 105-a may use a UE-specific C-DRX configuration to align communications with the UEs 115 and achieve network power savings. In some cases, the UE-specific C-DRX configuration may increase temporal alignment between the UEs 115 by setting an inactivity timer of the UEs 115 to a specific value (e.g., 0). However, because the base station 105-a configures the UEs 115 with a UE-specific C-DRX configuration during an RRC configuration period (e.g., via RRC signaling), this may impact scheduling for some of the UEs 115.

In the example of FIG. 2, the base station 105-*a* may dynamically configure the UEs 115 with a UE-group common C-DRX configuration 205 that aligns active durations of the UEs 115 and increases power savings at the base station 105-*a*. The base station 105-*a* may configure the UEs 115 with multiple UE-group common C-DRX configurations (e.g., via RRC signaling) and may dynamically indicate one of these UE-group common C-DRX configurations via dynamic signaling (e.g., DCI or MAC-CE). In some examples, the base station 105-*a* may also configure the UEs 115 with other network power saving features associated with the UE-group common C-DRX configurations. After receiving an indication of the UE-group common C-DRX configuration 205, the UEs 115 may activate network power saving features (e.g., procedures specified for enhanced network power savings) associated with the UE-group common C-DRX configuration 205. That is, receiving an indication of the UE-group common C-DRX configuration 205 may trigger (e.g., turn on) network power saving features at the UEs 115.

The base station 105-*a* may configure the UEs 115 (e.g., via RRC signaling) with different UE-group common C-DRX configurations intended for network power savings at the base station 105-*a*. The UE-group common C-DRX configurations may correspond to different sleep modes (e.g., light sleep, deep sleep) of the base station 105-*a*. For example, the base station 105-*a* may configure the UEs 115 with a UE-group common C-DRX configuration based on a DTX cycle of the base station 105-*a*. That is, configuring the UEs 115 with different UE-group common C-DRX configurations may enable the base station 105-*a* to dynamically adjust a C-DRX configuration of the UEs 115 based on a sleep schedule of the base station 105-*a*.

The base station 105-*a* may also configure the UEs 115 with network power saving features associated with different UE-group common C-DRX configurations. For example, the base station 105-*a* may configure the UE 115-*b* to use different channel state information (CSI) reporting techniques, beam configurations, or transmit powers in combination with different UE-group common C-DRX configurations, which may further improve power savings at the base station 105-*a*. Thus, if the UEs 115 receive an indication of the UE-group common C-DRX configuration 205 from the base station 105-*a*, the UEs 115 may activate network power saving features associated with the UE-group common C-DRX configuration 205.

In some examples, the base station 105-*a* may indicate the UE-group common C-DRX configuration 205 to the UEs 115 via dynamic signaling (e.g., DCI or MAC-CE). For example, the base station 105-*a* may indicate the UE-group common C-DRX configuration 205 via a UE group DCI with a specific DCI format (e.g., DCI format 2_0 for dynamic slot format indicators or DCI format 2_6 for wake up signals). In response to receiving the dynamic indication, the UEs 115 may use the UE-group common C-DRX configuration 205 to communicate with the base station 105-*a*. In some examples, the base station 105-*a* may configure a delay (e.g., a timeline) between when the UEs 115 receive the dynamic indication of the UE-group common C-DRX configuration 205 and when the UEs 115 apply the UE-group common C-DRX configuration 205.

In some examples, the UE-group common C-DRX configuration 205 may overwrite existing C-DRX configurations or default C-DRX configurations of the UEs 115. For example, if the base station 105-*a* configures the UE 115-*a* with a UE specific C-DRX configuration (e.g., specific to the UE 115-*a*) via RRC signaling and subsequently indicates the UE-group common C-DRX configuration 205 to the UE 115-*a* via dynamic signaling, the UE 115-*a* may switch from the UE specific C-DRX configuration to the UE-group common C-DRX configuration 205. In some examples, the default C-DRX configurations of the UEs 115 may correspond to a normal operating mode of the base station 105-*a* or a power saving mode (e.g., a DTX mode) of the base station 105-*a*. Additionally or alternatively, the default C-DRX configurations of the UEs 115 may be associated with a unique identifier.

Configuring the UEs 115 with the UE-group common C-DRX configuration 205 may increase power savings at the base station 105-*a* and reduce overall power consumption in the wireless communications system 200. The UE-group common C-DRX configuration 205 may align active durations of the UEs 115 such that the base station 105-*a* may communicate with the UEs 115 in a reduced number of frames. As such, the base station 105-*a* may remain in an inactive mode (e.g., sleep mode) for a longer duration while operating in a DTX mode, which may enable the base station 105-*a* to experience reduced power consumption and improved DTX efficiency, among other benefits.

Figure 3:
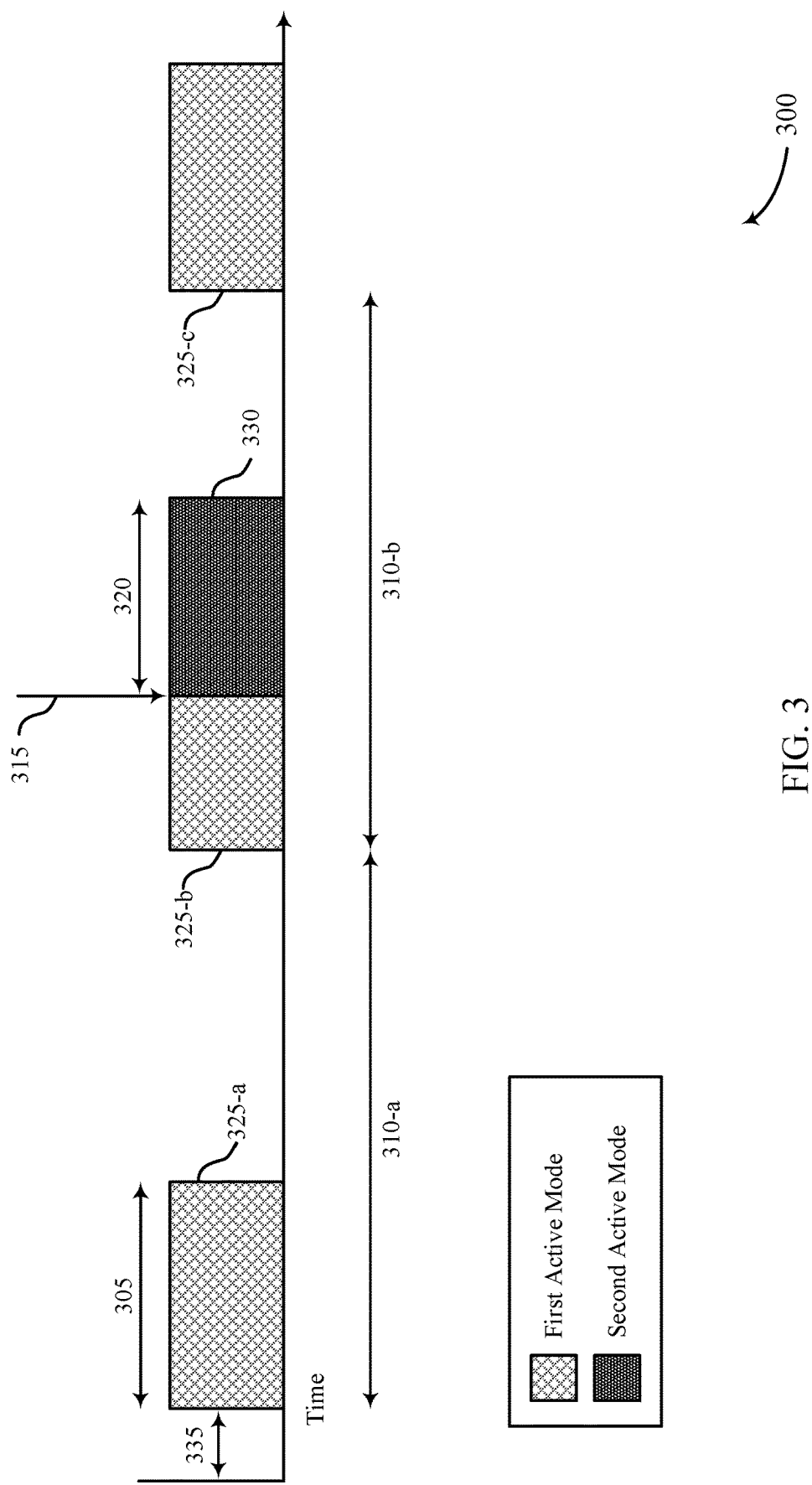
FIG. 3 illustrates an example of a communications scheme that supports techniques for wireless communication in C-DRX mode in accordance with aspects of the present disclosure.

FIG. 3 illustrates an example of a communications scheme 300 that supports techniques for wireless communication in C-DRX mode in accordance with aspects of the present disclosure. The communications scheme 300 may implement or be implemented by aspects of the wireless communications system 100 or the wireless communications system 200. For example, the communications scheme 300 may be implemented by a base station 105 or a UE 115, which may be examples of corresponding devices described with reference to FIG. 1.

A base station 105 may configure a UE 115 with a DRX configuration (e.g., via RRC signaling). The DRX configuration may include an active duration 305, cycle durations 310, an inactivity timer 320, and a timing offset 335. The active duration 305 may refer to a time duration in which the UE 115 is configured to be in an active mode. The UE 115 may be configured to monitor a PDCCH during the active duration 305. In some cases, the active duration 305 may also be referred to as an ON duration, a DRX active time, or an active reception period, among other examples.

The cycle durations 310 may refer to a time period between active durations 305 of the UE 115. For example, a cycle duration 310-*a* may refer to a duration between a first time at which the UE 115 is configured to enter an active mode 325-*a* and a second time at which the UE 115 is configured to enter an active mode 325-*b*. Likewise, a cycle duration 310-*b* may refer to a duration between the second time at which the UE 115 is configured to enter the active mode 325-*b* and a third time at which the UE 115 is configured to enter an active mode 325-*c*. In some cases, the cycle durations 310 may also be referred to as DRX cycle durations, C-DRX cycle durations, or cycle lengths, among other examples. The active modes 325 may also be referred to as active reception modes, C-DRX modes, or DRX modes, among other examples.

The inactivity timer 320 may refer to a time duration for which the UE 115 is configured to remain in an active mode after receiving a PDCCH transmission. For example, the UE 115 may remain in an active mode 330 (e.g., for a time duration that corresponds to the inactivity timer 320) after receiving a PDCCH transmission 315 from the base station 105. In some cases, the inactivity timer 320 may also be referred to as a DRX inactivity timer. The timing offset 335 may refer to a time period between the beginning of a scheduling unit (e.g., frame, subframe, slot) and the first time at which the UE 115 is configured to enter the active mode 325-*a*. The timing offset 335 may also be referred to as an offset parameter or a frame offset, among other examples.

In accordance with the DRX configuration, the UE 115 may enter a sleep mode during periods of inactivity. For example, if the UE 115 is not configured to be in an active mode 325 and the inactivity timer 320 has expired (e.g., if the UE 115 has not recently received any PDCCH transmissions), the UE 115 may enter a sleep mode to conserve power. The UE 115 may remain in the sleep mode until the UE 115 is scheduled to receive a transmission or until the UE 115 is configured to return to an active mode 325. In some cases, the DRX configuration may be a UE-specific C-DRX configuration. In accordance with the UE-specific C-DRX configuration, the UE 115 may be in a connected mode with the base station 105 even when the UE 115 is in a sleep mode.

In some cases, the base station 105 may experience reduced power consumption if active durations 305 of the UE 115 align with active durations of a second UE 115. For example, if the UE 115 and the second UE 115 are active in the same frames, the base station 105 may communicate with the UE 115 and the second UE 115 in these frames and may enter a sleep mode in other frames (e.g., frames in which the UE 115 and the second UE 115 are in a sleep mode). In some cases, however, the UE 115 and the second UE 115 may have different UE-specific C-DRX configurations and may wake up in different frames. As a result, the base station 105 may be active in more frames and may spend less time in sleep mode.

In accordance with the described techniques, the base station 105 may experience improved power savings by configuring the UE 115 and the second UE 115 with a UE-group common C-DRX configuration. The UE-group common C-DRX configuration may align active durations 305 of the UE 115 with active durations of the second UE 115 such that communications between the base station 105, the UE 115, and the second UE 115 are concentrated in the same time resources (e.g., slots, frames). As such, the base station 105 may remain in sleep mode for a longer duration and may experience greater power savings, which may reduce overall network power consumption.

Figure 4:
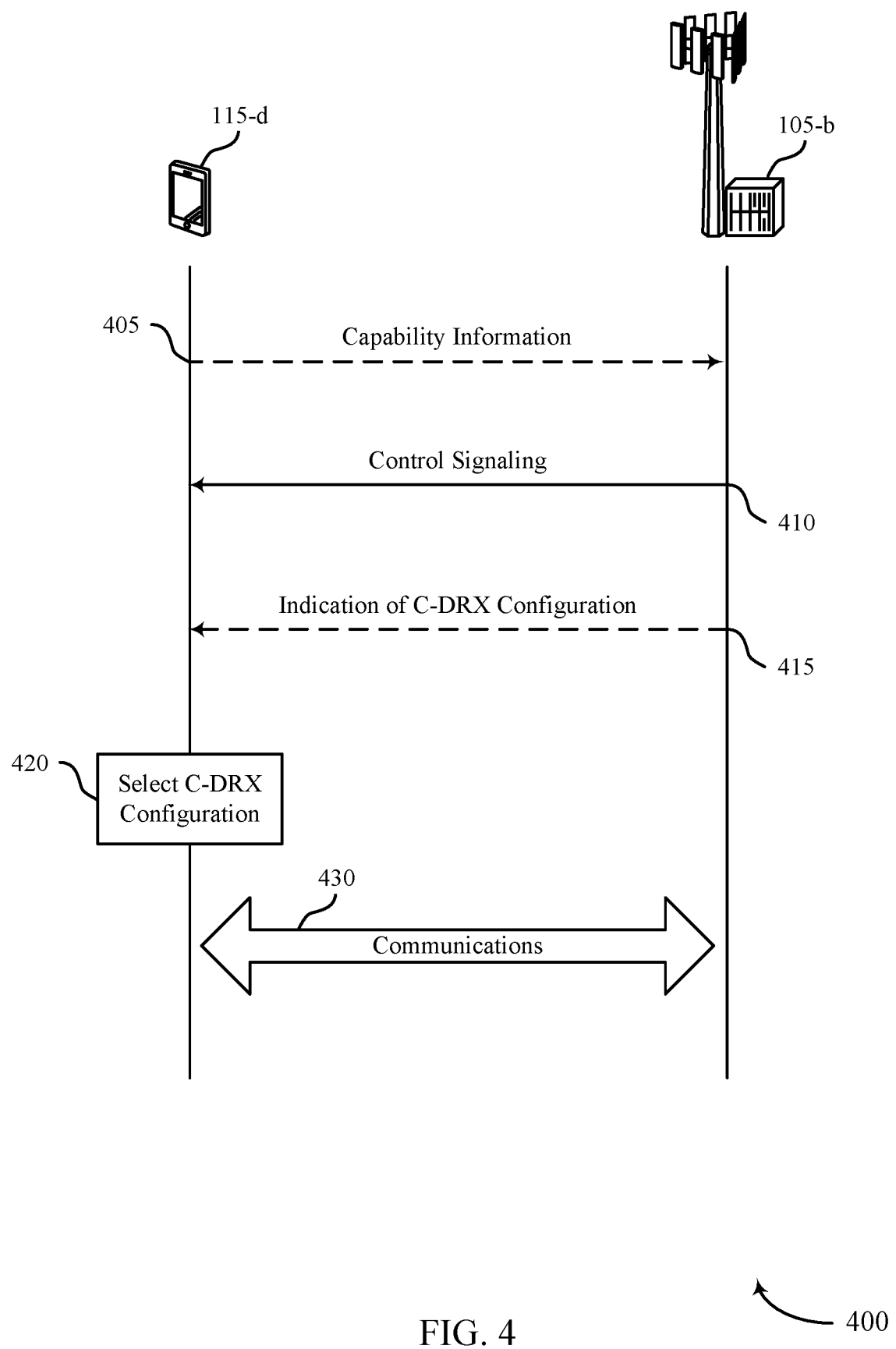
FIG. 4 illustrates an example of a process flow that supports techniques for wireless communication in C-DRX mode in accordance with aspects of the present disclosure.

FIG. 4 illustrates an example of a process flow 400 that supports techniques for wireless communication in C-DRX mode in accordance with aspects of the present disclosure. The process flow 400 may implement or be implemented by aspects of the wireless communications system 100 or the wireless communications system 200. For example, the process flow 400 may include a base station 105-*b* and a UE 115-*d*, which may be examples of corresponding devices described with reference to FIGS. 1 and 2. In the following description of the process flow 400, operations between the base station 105-*b* and the UE 115-*d* may be performed in a different order or at a different time than as shown. Additionally or alternatively, some operations may be omitted from the process flow 400, and other operations may be added to the process flow 400.

At 405, the UE 115-*d* may transmit capability information to the base station 105-*b*. The capability information may indicate a capability of the UE 115-*d* to switch between C-DRX configurations. At 410, the base station 105-*b* may transmit control signaling to the UE 115-*d* that indicates a set of C-DRX configurations. In some examples, the control signaling may include RRC signaling and the set of C-DRX configurations may include multiple UE-group common C-DRX configurations corresponding to different power modes of the base station 105-*b*. Additionally or alternatively, the set of C-DRX configurations may include a UE-specific C-DRX configuration associated with the UE 115-*d*. In some examples, the base station 105-*b* may transmit the control signaling based on receiving the capability information from the UE 115-*d* at 405.

In some examples, the UE 115-*d* may receive, from the base station 105-*b*, an indication of a C-DRX configuration from the set of C-DRX configurations. The base station 105-*b* may transmit the indication via DCI or a MAC-CE. In some examples, the indication may include timing information indicating a period between when the UE 115-*d* receives the indication and when the UE 115-*d* is to enable the indicated C-DRX configuration. The indicated C-DRX configuration may include an active duration, a cycle duration, an inactivity timer, and a timing offset (as described with reference to FIG. 3).

At 420, the UE 115-*d* may select the C-DRX configuration from the set of C-DRX configurations and may enable the selected C-DRX configuration based on receiving the control signaling, the indication, or both. In some examples, the UE 115-*d* may switch from a default C-DRX configuration to the selected C-DRX configuration based on receiving the control information, the indication, or both. For example, the UE 115-*d* may switch from a UE-specific C-DRX configuration to a UE-group common C-DRX configuration based on receiving the indication from the base station 105-*b*. In some examples, the default C-DRX configuration of the UE 115-*d* may correspond to a normal operating mode of the base station 105-*b* or a power saving mode of the base station 105-*b*. Additionally or alternatively, the default C-DRX configuration may be associated with a unique identifier. In some examples, the UE 115-*d* may enable a power saving mode if the selected C-DRX configuration is a UE-group common C-DRX configuration.

At 430, the UE 115-*d* may perform wireless communications with the base station 105-*b* using the selected C-DRX configuration. In some examples, the UE 115-*d* may perform the wireless communications with the base station 105-*b* based on switching from a default C-DRX configuration to the selected C-DRX configuration. Additionally or alternatively, the UE 115-*d* may perform the wireless communications with the base station 105-*b* based on enabling a power saving mode. For example, the UE 115-*d* may perform the wireless communications using one or more CSI reporting techniques, beam configurations, or transmission parameters in accordance with a network power saving mode.

Configuring the UE 115-*d* to perform wireless communications using the selected C-DRX configuration may result in improved power savings at the base station 105-*b*. For example, the base station 105-*b* may configure the UE 115-*d* with a UE-group common C-DRX configuration that aligns active durations of the UE 115-*d* with active durations of other UEs 115 (not shown). Aligning these active durations may reduce a number of frames in which the base station 105-*b* is scheduled to perform wireless communications, which may enable the base station 105-*b* to enter a sleep mode for a longer duration (e.g., during a DTX cycle). As a result, the base station 105-*b* may experience greater power savings and improved DTX efficiency, among other benefits.

Figure 5:
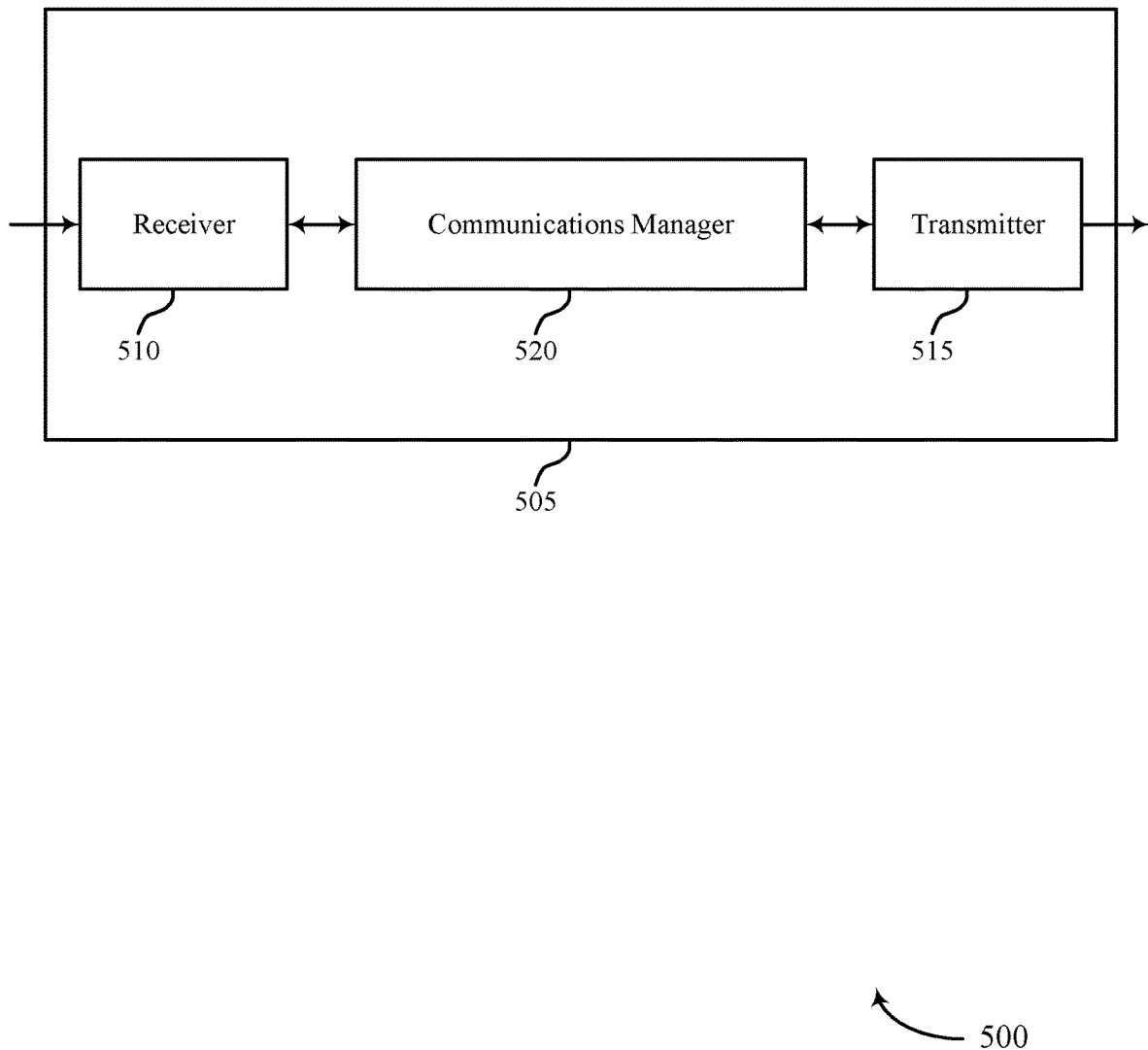
FIGS. 5 and 6 show block diagrams of devices that support techniques for wireless communication in C-DRX mode in accordance with aspects of the present disclosure.

FIG. 5 shows a block diagram 500 of a device 505 that supports techniques for wireless communication in C-DRX mode in accordance with aspects of the present disclosure.

The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for wireless communication in C-DRX mode). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for wireless communication in C-DRX mode). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for wireless communication in C-DRX mode as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510. The communications manager 520 may send information to the transmitter 515. The communications manager 520 may be integrated in combination with the receiver 510, the transmitter 515, or both to receive information, transmit information, or perform various other operations as described herein.

The communications manager 520 may support wireless communication at the device 505 in accordance with examples as disclosed herein. For example, the communications manager 520 may be configured as or otherwise support a means for receiving, from a base station, control signaling indicating a set of C-DRX configurations including a first C-DRX configuration and a second C-DRX configuration, where at least one C-DRX configuration of the set of C-DRX configurations includes a UE-group common C-DRX configuration. The communications manager 520 may be configured as or otherwise support a means for selecting a C-DRX configuration from the set of C-DRX configurations based on receiving the control signaling. The communications manager 520 may be configured as or otherwise support a means for performing the wireless communication based on the selected C-DRX configuration.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced network power consumption based on using a UE-group common C-DRX configuration and power saving features related to the UE-group common C-DRX configuration. For example, using a UE-group common C-DRX configuration may enable a base station 105 to remain in sleep mode for an extended duration, which may reduce overall network power consumption.

Figure 6:
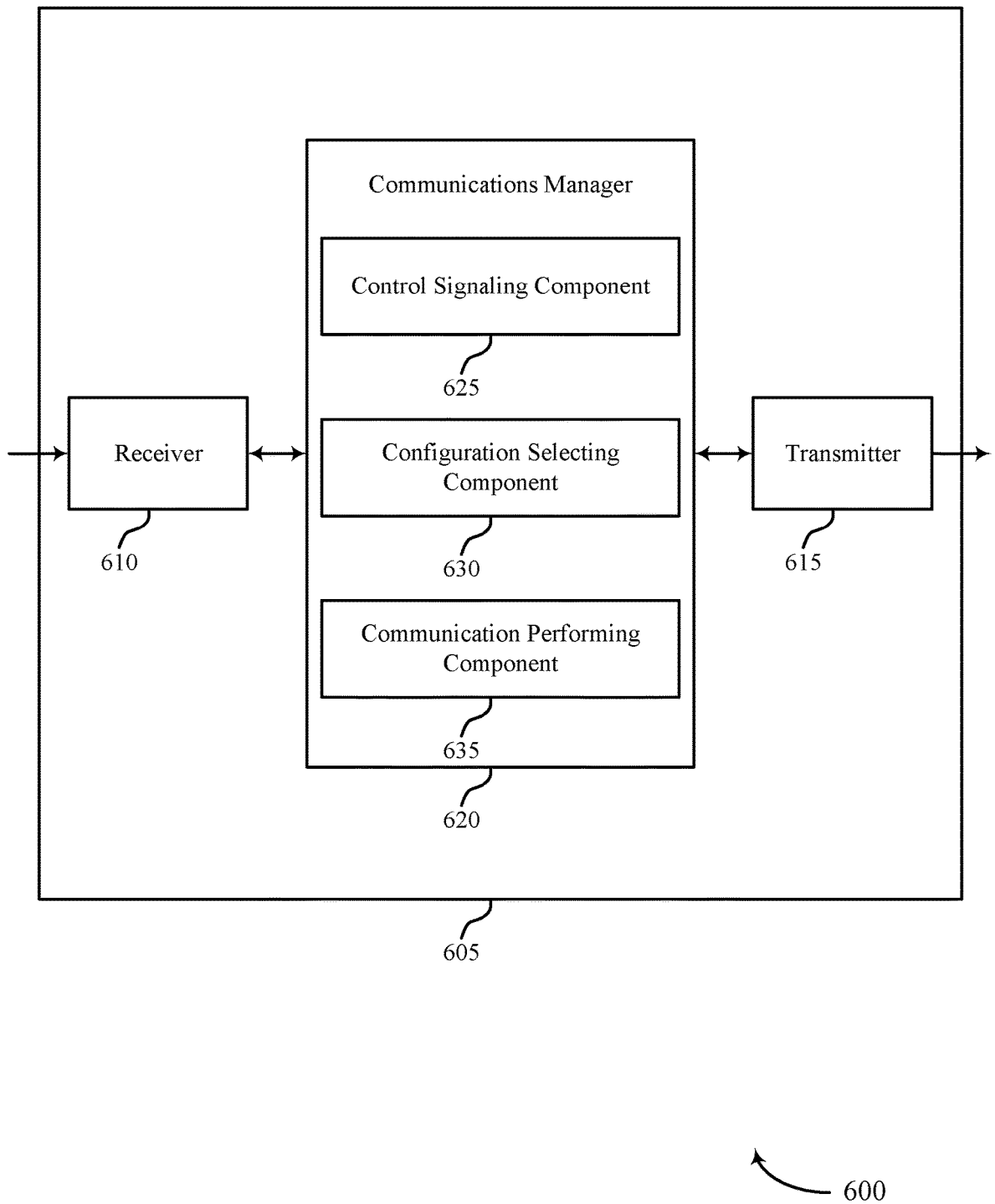

FIG. 6 shows a block diagram 600 of a device 605 that supports techniques for wireless communication in C-DRX mode in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for wireless communication in C-DRX mode). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for wireless communication in C-DRX mode). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for wireless communication in C-DRX mode as described herein. For example, the communications manager 620 may include a control signaling component 625, a configuration selecting component 630, a communication performing component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610. The communications manager 620 may send information to the transmitter 615. The communications manager 620 may be integrated in combination with the receiver 610, the transmitter 615, or both to receive information, transmit information, or perform various other operations as described herein.

The communications manager 620 may support wireless communication at the device 605 in accordance with examples as disclosed herein. The control signaling component 625 may be configured as or otherwise support a means for receiving, from a base station, control signaling indicating a set of C-DRX configurations including a first C-DRX configuration and a second C-DRX configuration, where at least one C-DRX configuration of the set of C-DRX configurations includes a UE-group common C-DRX configuration. The configuration selecting component 630 may be configured as or otherwise support a means for selecting a C-DRX configuration from the set of C-DRX configurations based on receiving the control signaling. The communication performing component 635 may be configured as or otherwise support a means for performing the wireless communication based on the selected C-DRX configuration.

Figure 7:
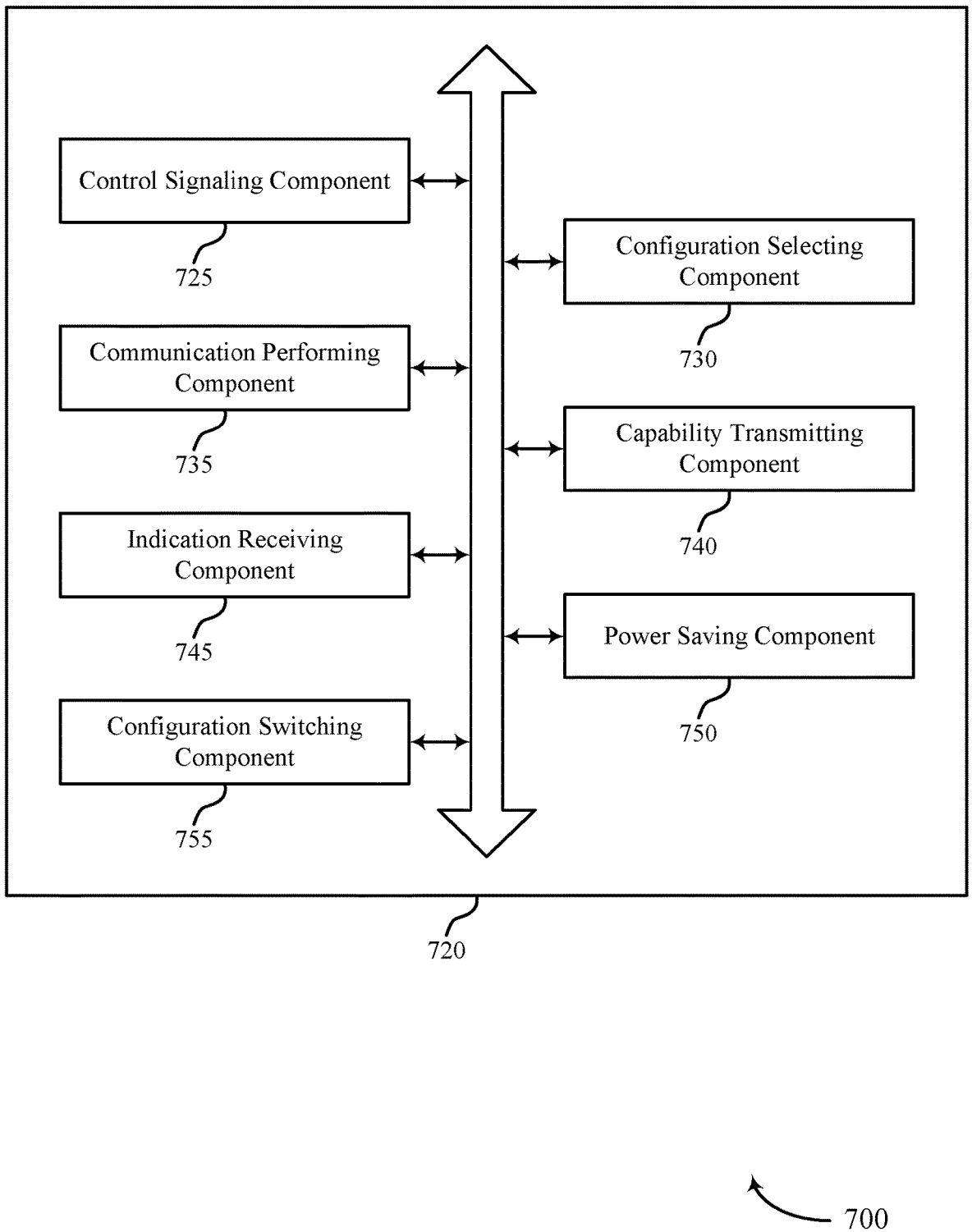
FIG. 7 shows a block diagram of a communications manager that supports techniques for wireless communication in C-DRX mode in accordance with aspects of the present disclosure.

FIG. 7 shows a block diagram 700 of a communications manager 720 that supports techniques for wireless communication in C-DRX mode in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for wireless communication in C-DRX mode as described herein. For example, the communications manager 720 may include a control signaling component 725, a configuration selecting component 730, a communication performing component 735, a capability transmitting component 740, an indication receiving component 745, a power saving component 750, a configuration switching component 755, or any combination thereof. Each of these components may communicate, directly or indirectly, with one another (e.g., via one or more buses).

The communications manager 720 may support wireless communication at the device 705 in accordance with examples as disclosed herein. The control signaling component 725 may be configured as or otherwise support a means for receiving, from a base station, control signaling indicating a set of C-DRX configurations including a first C-DRX configuration and a second C-DRX configuration, where at least one C-DRX configuration of the set of C-DRX configurations includes a UE-group common C-DRX configuration. In some examples, the first C-DRX configuration includes a UE-specific C-DRX configuration. In some examples, the second C-DRX configuration includes the UE-group common C-DRX configuration.

The configuration selecting component 730 may be configured as or otherwise support a means for selecting a C-DRX configuration from the set of C-DRX configurations based on receiving the control signaling. The communication performing component 735 may be configured as or otherwise support a means for performing the wireless communication based on the selected C-DRX configuration. In some examples, the capability transmitting component 740 may be configured as or otherwise support a means for transmitting information associated with a capability of the device 705 to select between different C-DRX configurations. In some examples, the control signaling component 725 may be configured as or otherwise support a means for receiving the control signaling based on transmitting the information.

In some examples, the indication receiving component 745 may be configured as or otherwise support a means for receiving an indication of the C-DRX configuration from the set of C-DRX configurations for use by the device 705. In some examples, the configuration selecting component 730 may be configured as or otherwise support a means for selecting the C-DRX configuration from the set of C-DRX configurations based on receiving the indication. In some examples, to support receiving the indication, the indication receiving component 745 may be configured as or otherwise support a means for receiving DCI that includes the indication, where the DCI includes a UE-group DCI. In some examples, the DCI includes timing information indicating a period between receiving the DCI and enabling the C-DRX configuration. In some examples, to support receiving the indication, the indication receiving component 745 may be configured as or otherwise support a means for receiving a MAC-CE that includes the indication. In some examples, the MAC-CE includes timing information indicating a period between receiving the MAC-CE and enabling the C-DRX configuration.

In some examples, the configuration switching component 755 may be configured as or otherwise support a means for switching from a default C-DRX configuration to the selected C-DRX configuration based on receiving the indication. In some examples, the communication performing component 735 may be configured as or otherwise support a means for performing the wireless communication based on switching from the default C-DRX configuration to the selected C-DRX configuration. In some examples, the default C-DRX configuration includes a UE-specific C-DRX configuration and the selected C-DRX configuration includes a UE-group common C-DRX configuration. In some examples, the default C-DRX configuration corresponds to a normal operating mode of the base station or a power saving mode of the base station. In some examples, the default C-DRX configuration is associated with a unique identifier.

In some examples, the power saving component 750 may be configured as or otherwise support a means for enabling a power saving mode based on the selected C-DRX configuration including a UE-group common C-DRX configuration. In some examples, the communication performing component 735 may be configured as or otherwise support a means for performing the wireless communication based on enabling the power saving mode. In some examples, to support receiving the control signaling, the control signaling component 725 may be configured as or otherwise support a means for receiving an RRC message indicating the set of C-DRX configurations. In some examples, the set of C-DRX configurations includes a set of multiple UE-group common C-DRX configurations. In some examples, each UE-group common C-DRX configuration of the set of multiple UE-group common C-DRX configurations corresponds to a separate power mode of the base station.

Figure 8:
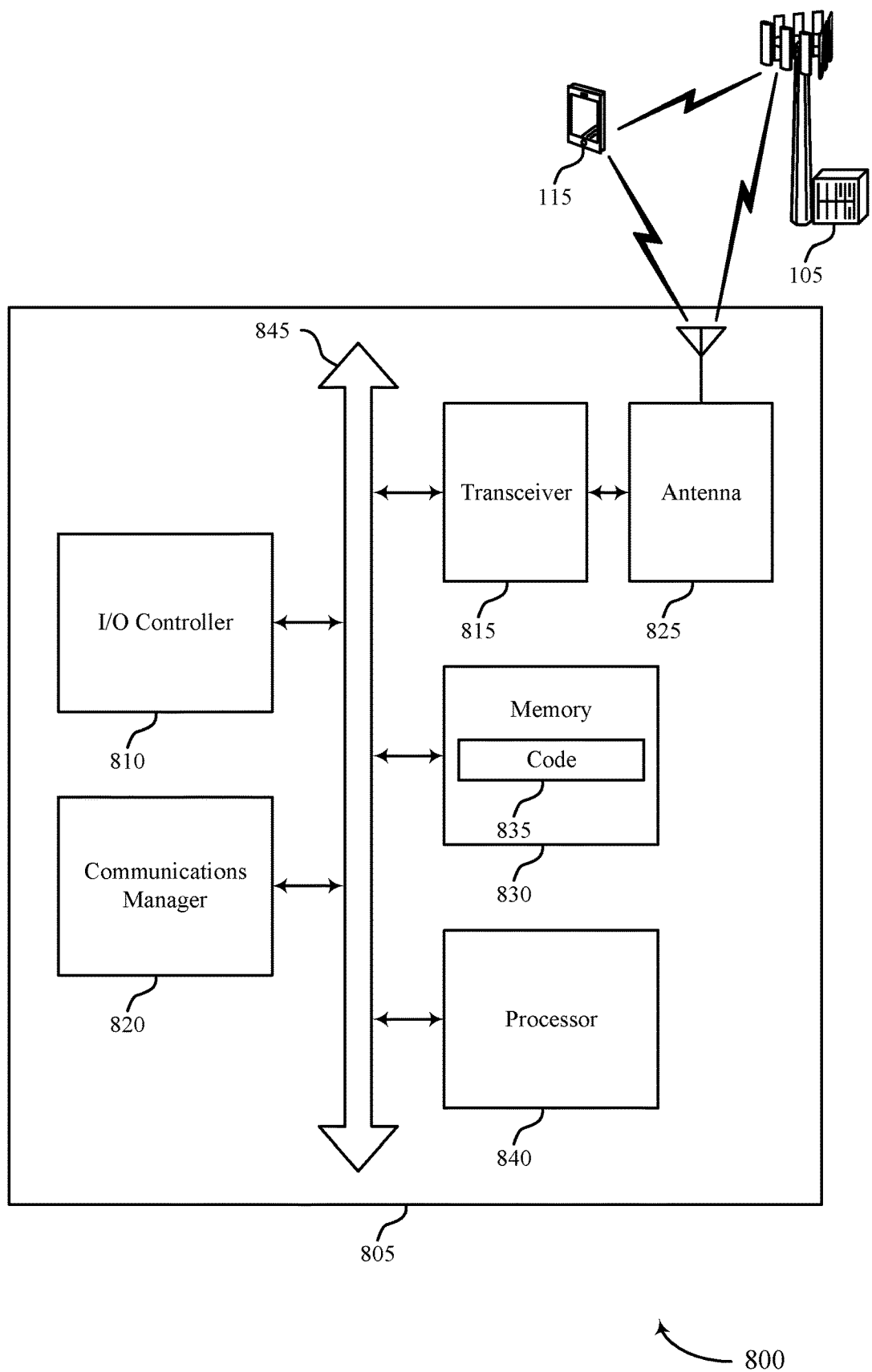
FIG. 8 shows a diagram of a system including a device that supports techniques for wireless communication in C-DRX mode in accordance with aspects of the present disclosure.

FIG. 8 shows a diagram of a system 800 including a device 805 that supports techniques for wireless communication in C-DRX mode in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for wireless communication in C-DRX mode). For example, the device 805 or a component of the device 805 may include a processor 840 and memory 830 coupled to the processor 840, the processor 840 and memory 830 configured to perform various functions described herein.

The communications manager 820 may support wireless communication at the device 805 in accordance with examples as disclosed herein. For example, the communications manager 820 may be configured as or otherwise support a means for receiving, from a base station, control signaling indicating a set of C-DRX configurations including a first C-DRX configuration and a second C-DRX configuration, where at least one C-DRX configuration of the set of C-DRX configurations includes a UE-group common C-DRX configuration. The communications manager 820 may be configured as or otherwise support a means for selecting a C-DRX configuration from the set of C-DRX configurations based on receiving the control signaling. The communications manager 820 may be configured as or otherwise support a means for performing the wireless communication based on the selected C-DRX configuration.

By including or configuring the communications manager 820 in accordance with examples as described herein, the device 805 may support techniques for reduced network power consumption based on using a UE-group common C-DRX configuration to communicate with a base station 105. Specifically, using the UE-group common C-DRX configuration may improve power savings at the base station 105 by increasing a number of empty frames in which the base station 105 can enter a sleep mode.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for wireless communication in C-DRX mode as described herein, or the processor 840 and the memory 830 may be otherwise configured to perform or support such operations.

Figure 9:
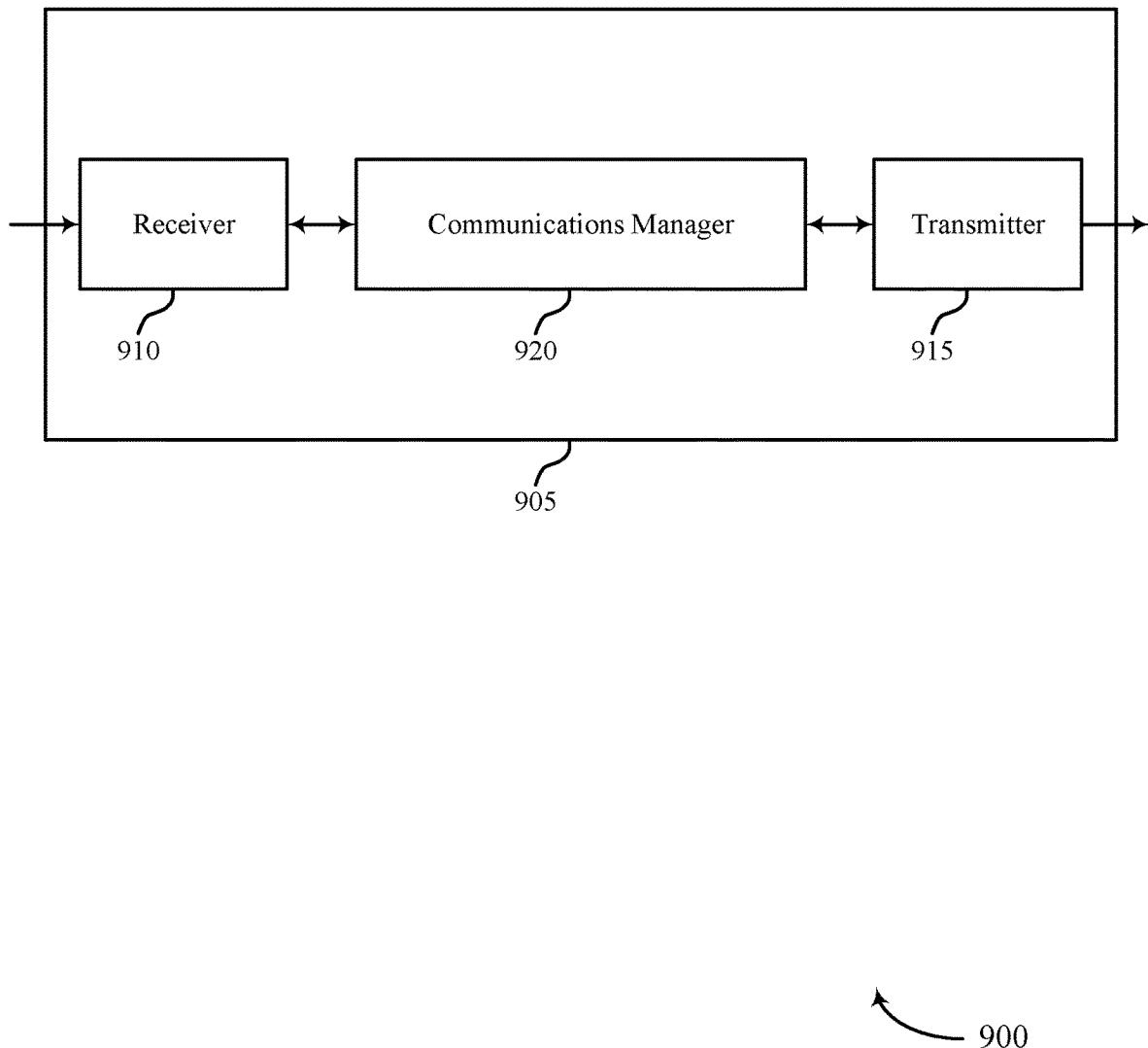
FIGS. 9 and 10 show block diagrams of devices that support techniques for wireless communication in C-DRX mode in accordance with aspects of the present disclosure.

FIG. 9 shows a block diagram 900 of a device 905 that supports techniques for wireless communication in C-DRX mode in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for wireless communication in C-DRX mode). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for wireless communication in C-DRX mode). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for wireless communication in C-DRX mode as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910. The communications manager 920 may send information to the transmitter 915. The communications manager 920 may be integrated in combination with the receiver 910, the transmitter 915, or both to receive information, transmit information, or perform various other operations as described herein.

The communications manager 920 may support wireless communication at the device 905 in accordance with examples as disclosed herein. For example, the communications manager 920 may be configured as or otherwise support a means for transmitting, to a UE, control signaling indicating a set of C-DRX configurations including a first C-DRX configuration and a second C-DRX configuration, where at least one C-DRX configuration of the set of C-DRX configurations includes a UE-group common C-DRX configuration. The communications manager 920 may be configured as or otherwise support a means for selecting a C-DRX configuration from the set of C-DRX configurations based on transmitting the control signaling. The communications manager 920 may be configured as or otherwise support a means for performing the wireless communication based on the selected C-DRX configuration.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced network power consumption based on configuring a set of UEs 115 with a UE-group common C-DRX configuration. The UE-group common C-DRX configuration may enable the device 905 to remain in a sleep mode (e.g., during a DRX cycle) for a longer duration, which may result in improved power savings at the device 905.

Figure 10:
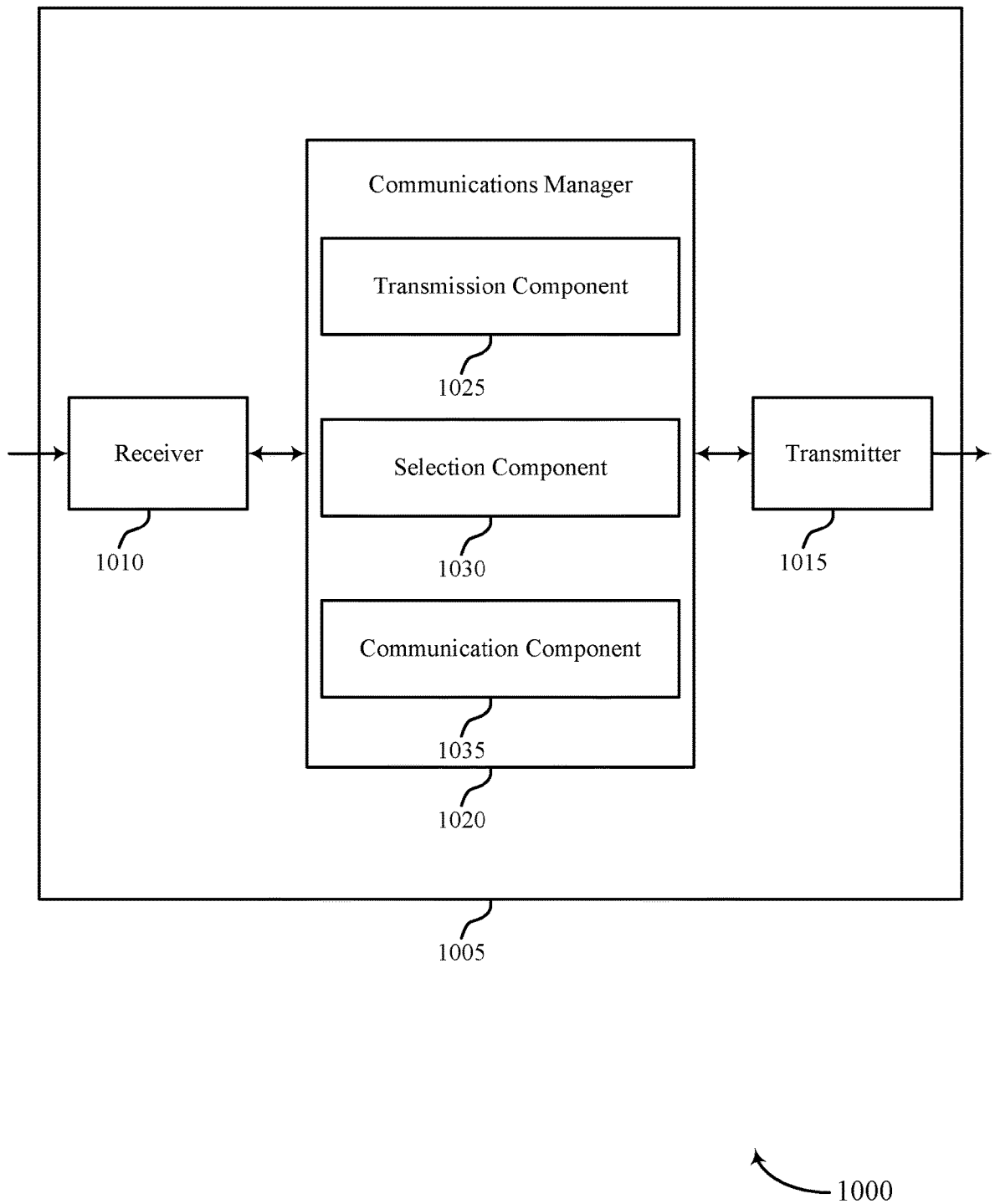

FIG. 10 shows a block diagram 1000 of a device 1005 that supports techniques for wireless communication in C-DRX mode in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for wireless communication in C-DRX mode). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for wireless communication in C-DRX mode). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for wireless communication in C-DRX mode as described herein. For example, the communications manager 1020 may include a transmission component 1025, a selection component 1030, a communication component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010. The communications manager 1020 may send information to the transmitter 1015. The communications manager 1020 may be integrated in combination with the receiver 1010, the transmitter 1015, or both to receive information, transmit information, or perform various other operations as described herein.

The communications manager 1020 may support wireless communication at the device 1005 in accordance with examples as disclosed herein. The transmission component 1025 may be configured as or otherwise support a means for transmitting, to a UE, control signaling indicating a set of C-DRX configurations including a first C-DRX configuration and a second C-DRX configuration, where at least one C-DRX configuration of the set of C-DRX configurations includes a UE-group common C-DRX configuration. The selection component 1030 may be configured as or otherwise support a means for selecting a C-DRX configuration from the set of C-DRX configurations based on transmitting the control signaling. The communication component 1035 may be configured as or otherwise support a means for performing the wireless communication based on the selected C-DRX configuration.

Figure 11:
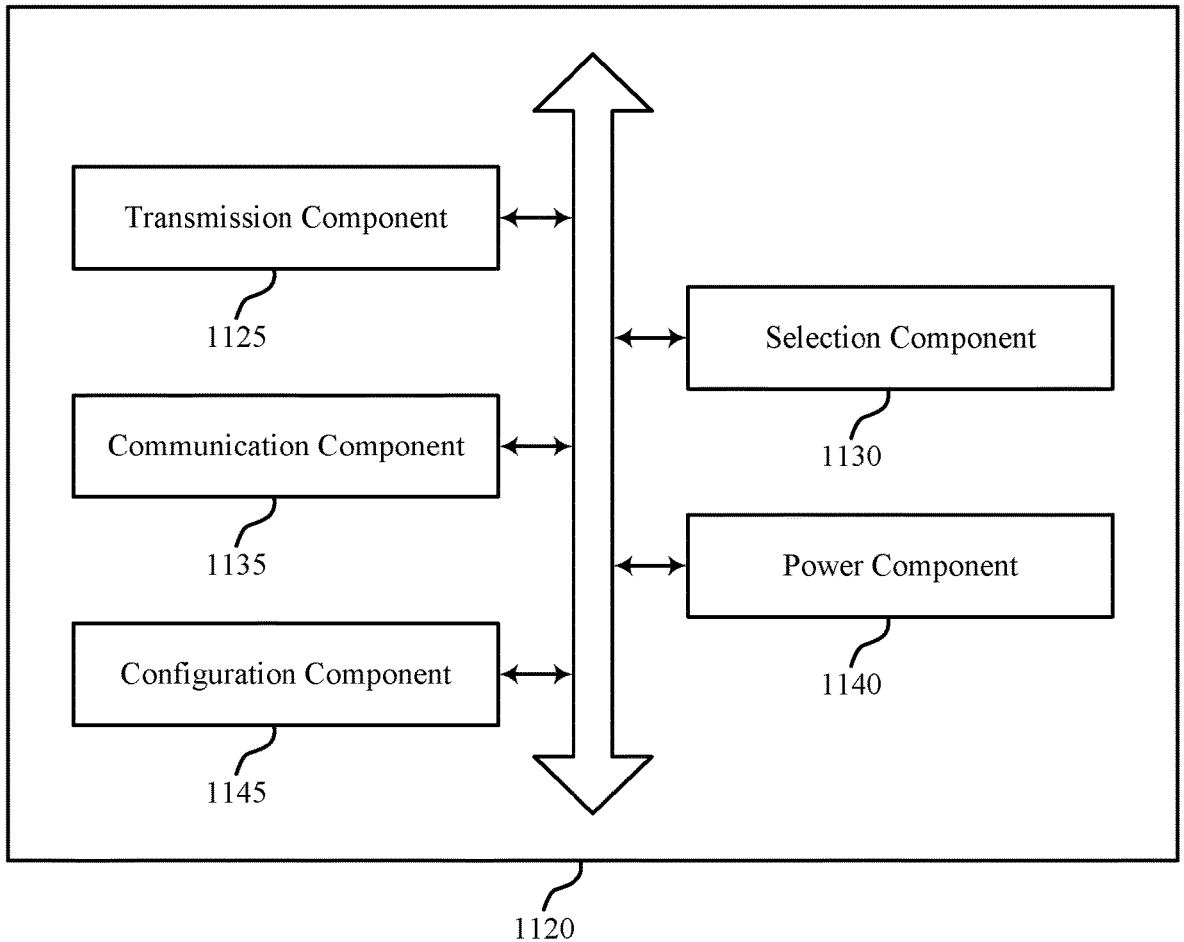
FIG. 11 shows a block diagram of a communications manager that supports techniques for wireless communication in C-DRX mode in accordance with aspects of the present disclosure.

FIG. 11 shows a block diagram 1100 of a communications manager 1120 that supports techniques for wireless communication in C-DRX mode in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for wireless communication in C-DRX mode as described herein. For example, the communications manager 1120 may include a transmission component 1125, a selection component 1130, a communication component 1135, a power component 1140, a configuration component 1145, or any combination thereof. Each of these components may communicate, directly or indirectly, with one another (e.g., via one or more buses).

The communications manager 1120 may support wireless communication at the device 1105 in accordance with examples as disclosed herein. The transmission component 1125 may be configured as or otherwise support a means for transmitting, to a UE, control signaling indicating a set of C-DRX configurations including a first C-DRX configuration and a second C-DRX configuration, where at least one C-DRX configuration of the set of C-DRX configurations includes a UE-group common C-DRX configuration. In some examples, the first C-DRX configuration includes a UE-specific C-DRX configuration. In some examples, the second C-DRX configuration includes the UE-group common C-DRX configuration.

The selection component 1130 may be configured as or otherwise support a means for selecting a C-DRX configuration from the set of C-DRX configurations based on transmitting the control signaling. The communication component 1135 may be configured as or otherwise support a means for performing the wireless communication based on the selected C-DRX configuration. In some examples, the transmission component 1125 may be configured as or otherwise support a means for transmitting information associated with a capability of the UE to select between different C-DRX configurations. In some examples, the transmission component 1125 may be configured as or otherwise support a means for transmitting the control signaling based on transmitting the information.

In some examples, the transmission component 1125 may be configured as or otherwise support a means for transmitting an indication of the C-DRX configuration from the set of C-DRX configurations for use by the UE. In some examples, to support transmitting the indication, the transmission component 1125 may be configured as or otherwise support a means for transmitting DCI that includes the indication, where the DCI includes a UE-group DCI. In some examples, the DCI includes timing information indicating a period between transmitting the DCI and enabling the C-DRX configuration. In some examples, to support transmitting the indication, the transmission component 1125 may be configured as or otherwise support a means for transmitting a MAC-CE that includes the indication. In some examples, the MAC-CE includes timing information indicating a period between transmitting the MAC-CE and enabling the C-DRX configuration.

In some examples, the configuration component 1145 may be configured as or otherwise support a means for switching from a default C-DRX configuration to the selected C-DRX configuration based on transmitting the indication. In some examples, the configuration component 1145 may be configured as or otherwise support a means for performing the wireless communication based on switching from the default C-DRX configuration to the selected C-DRX configuration. In some examples, the default C-DRX configuration includes a UE-specific C-DRX configuration and the selected C-DRX configuration includes a UE-group common C-DRX configuration. In some examples, the power component 1140 may be configured as or otherwise support a means for enabling a power saving mode based on the selected C-DRX configuration including a UE-group common C-DRX configuration. In some examples, the communication component 1135 may be configured as or otherwise support a means for performing the wireless communication is based on enabling the power saving mode.

In some examples, to support transmitting the control signaling, the transmission component 1125 may be configured as or otherwise support a means for transmitting an RRC message indicating the set of C-DRX configurations. In some examples, the set of C-DRX configurations includes a set of multiple UE-group common C-DRX configurations. In some examples, each UE-group common C-DRX configuration of the set of multiple UE-group common C-DRX configurations corresponds to a separate power mode of the device 1105.

Figure 12:
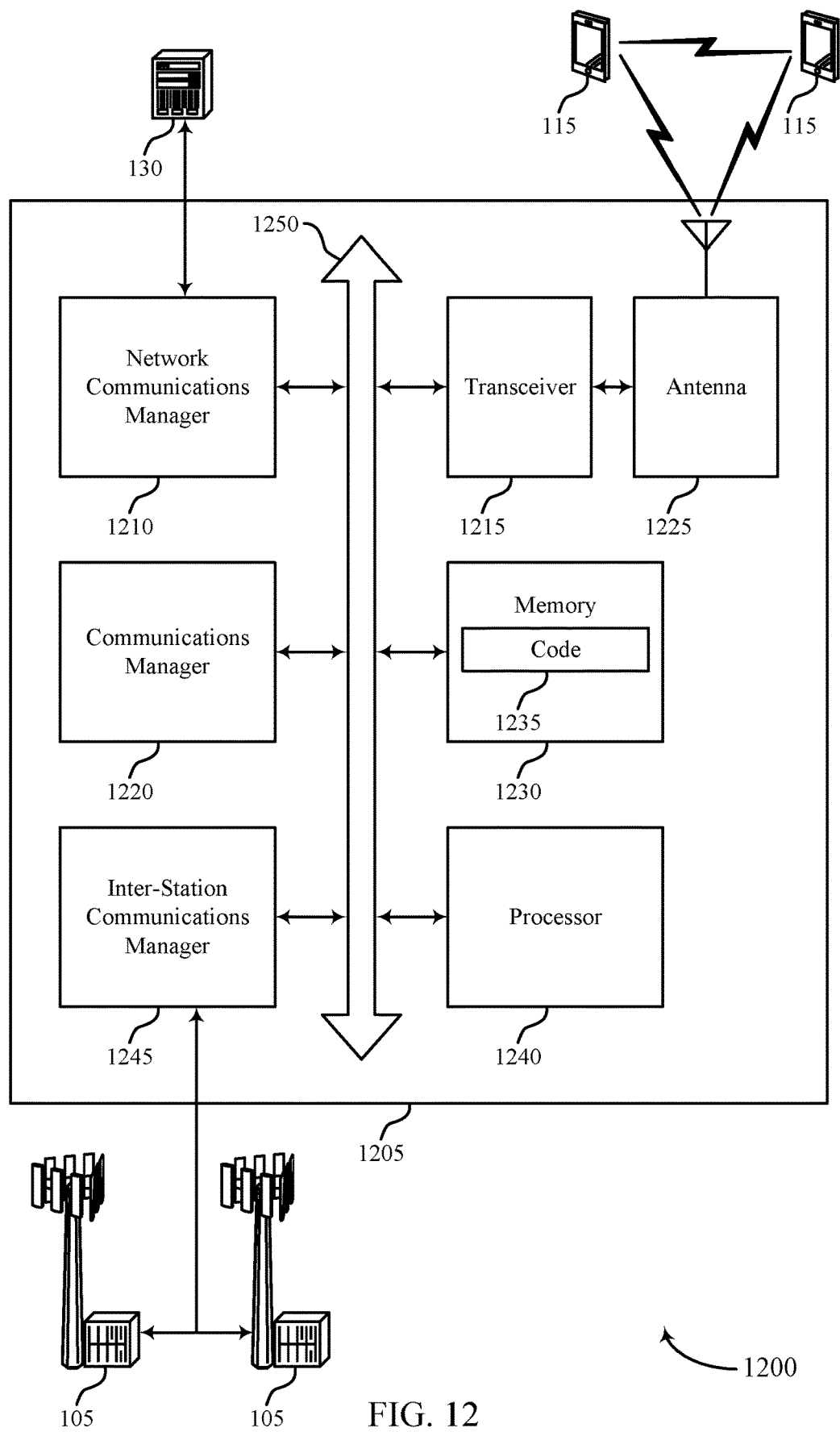
FIG. 12 shows a diagram of a system including a device that supports techniques for wireless communication in C-DRX mode in accordance with aspects of the present disclosure.

FIG. 12 shows a diagram of a system 1200 including a device 1205 that supports techniques for wireless communication in C-DRX mode in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for wireless communication in C-DRX mode). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at the device 1205 in accordance with examples as disclosed herein. For example, the communications manager 1220 may be configured as or otherwise support a means for transmitting, to a UE, control signaling indicating a set of C-DRX configurations including a first C-DRX configuration and a second C-DRX configuration, where at least one C-DRX configuration of the set of C-DRX configurations includes a UE-group common C-DRX configuration. The communications manager 1220 may be configured as or otherwise support a means for selecting a C-DRX configuration from the set of C-DRX configurations based on transmitting the control signaling. The communications manager 1220 may be configured as or otherwise support a means for performing the wireless communication based on the selected C-DRX configuration.

By including or configuring the communications manager 1220 in accordance with examples as described herein, the device 1205 may support techniques for reduced network power consumption based on configuring a set of UEs 115 with a UE-group common C-DRX configuration. The UE-group common C-DRX configuration may align active durations for the set of UEs 115, which may enable the device 1205 to schedule communications between the device 1205 and the set of UEs 115 in fewer frames. As a result, the device 1205 may have a higher number of empty frames in which the device 1205 can enter sleep mode.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for wireless communication in C-DRX mode as described herein, or the processor 1240 and the memory 1230 may be otherwise configured to perform or support such operations.

Figure 13:
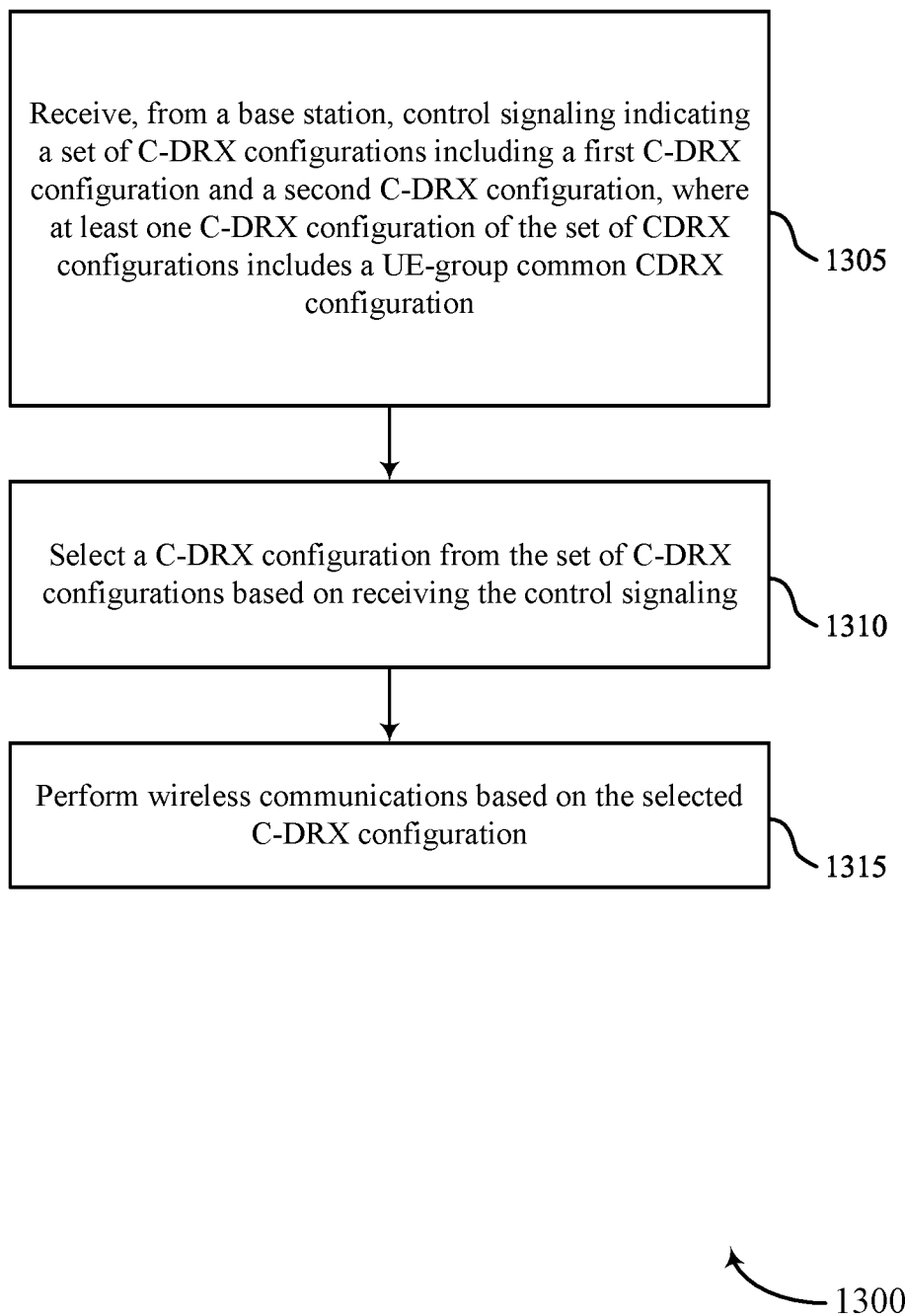
FIGS. 13 through 16 show flowcharts illustrating methods that support techniques for wireless communication in C-DRX mode in accordance with aspects of the present disclosure.

FIG. 13 shows a flowchart illustrating a method 1300 that supports techniques for wireless communication in C-DRX mode in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, control signaling indicating a set of C-DRX configurations including a first C-DRX configuration and a second C-DRX configuration, where at least one C-DRX configuration of the set of C-DRX configurations includes a UE-group common C-DRX configuration. The operations of 1305 may be performed in accordance with examples as disclosed herein. In some examples, aspects of the operations of 1305 may be performed by a control signaling component 725 as described with reference to FIG. 7.

At 1310, the method may include selecting a C-DRX configuration from the set of C-DRX configurations based on receiving the control signaling. The operations of 1310 may be performed in accordance with examples as disclosed herein. In some examples, aspects of the operations of 1310 may be performed by a configuration selecting component 730 as described with reference to FIG. 7.

At 1315, the method may include performing wireless communications based on the selected C-DRX configuration. The operations of 1315 may be performed in accordance with examples as disclosed herein. In some examples, aspects of the operations of 1315 may be performed by a communication performing component 735 as described with reference to FIG. 7.

Figure 14:
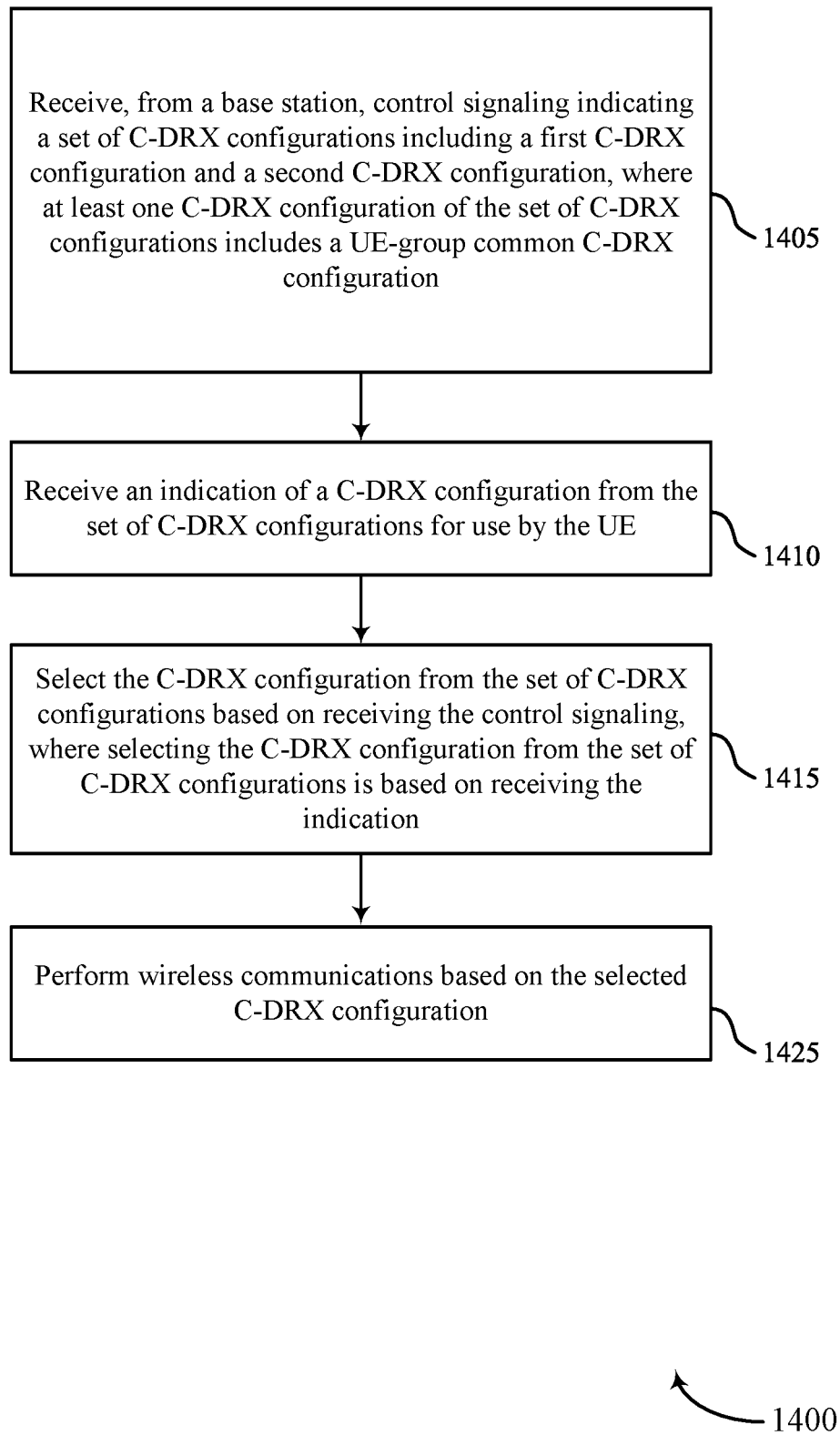

FIG. 14 shows a flowchart illustrating a method 1400 that supports techniques for wireless communication in C-DRX mode in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, control signaling indicating a set of C-DRX configurations including a first C-DRX configuration and a second C-DRX configuration, where at least one C-DRX configuration of the set of C-DRX configurations includes a UE-group common C-DRX configuration. The operations of 1405 may be performed in accordance with examples as disclosed herein. In some examples, aspects of the operations of 1405 may be performed by a control signaling component 725 as described with reference to FIG. 7.

At 1410, the method may include receiving an indication of the C-DRX configuration from the set of C-DRX configurations for use by the UE. The operations of 1410 may be performed in accordance with examples as disclosed herein. In some examples, aspects of the operations of 1410 may be performed by an indication receiving component 745 as described with reference to FIG. 7.

At 1415, the method may include selecting a C-DRX configuration from the set of C-DRX configurations based on receiving the control signaling, where selecting the C-DRX configuration from the set of C-DRX configurations is based on receiving the indication. The operations of 1415 may be performed in accordance with examples as disclosed herein. In some examples, aspects of the operations of 1415 may be performed by a configuration selecting component 730 as described with reference to FIG. 7.

At 1425, the method may include performing wireless communications based on the selected C-DRX configuration. The operations of 1425 may be performed in accordance with examples as disclosed herein. In some examples, aspects of the operations of 1425 may be performed by a communication performing component 735 as described with reference to FIG. 7.

Figure 15:
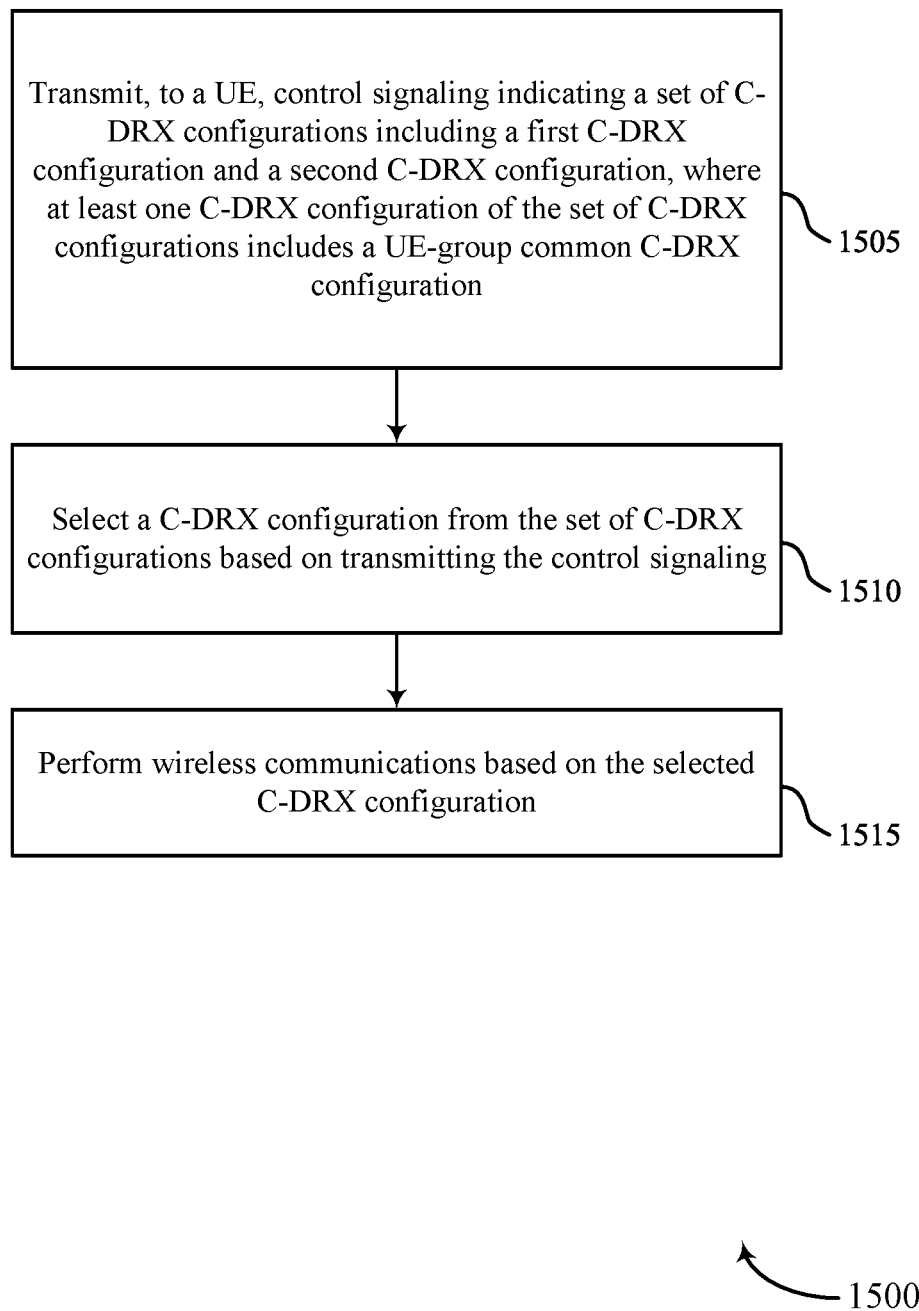

FIG. 15 shows a flowchart illustrating a method 1500 that supports techniques for wireless communication in C-DRX mode in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, control signaling indicating a set of C-DRX configurations including a first C-DRX configuration and a second C-DRX configuration, where at least one C-DRX configuration of the set of C-DRX configurations includes a UE-group common C-DRX configuration. The operations of 1505 may be performed in accordance with examples as disclosed herein. In some examples, aspects of the operations of 1505 may be performed by a transmission component 1125 as described with reference to FIG. 11.

At 1510, the method may include selecting a C-DRX configuration from the set of C-DRX configurations based on transmitting the control signaling. The operations of 1510 may be performed in accordance with examples as disclosed herein. In some examples, aspects of the operations of 1510 may be performed by a selection component 1130 as described with reference to FIG. 11.

At 1515, the method may include performing the wireless communication based on the selected C-DRX configuration. The operations of 1515 may be performed in accordance with examples as disclosed herein. In some examples, aspects of the operations of 1515 may be performed by a communication component 1135 as described with reference to FIG. 11.

Figure 16:
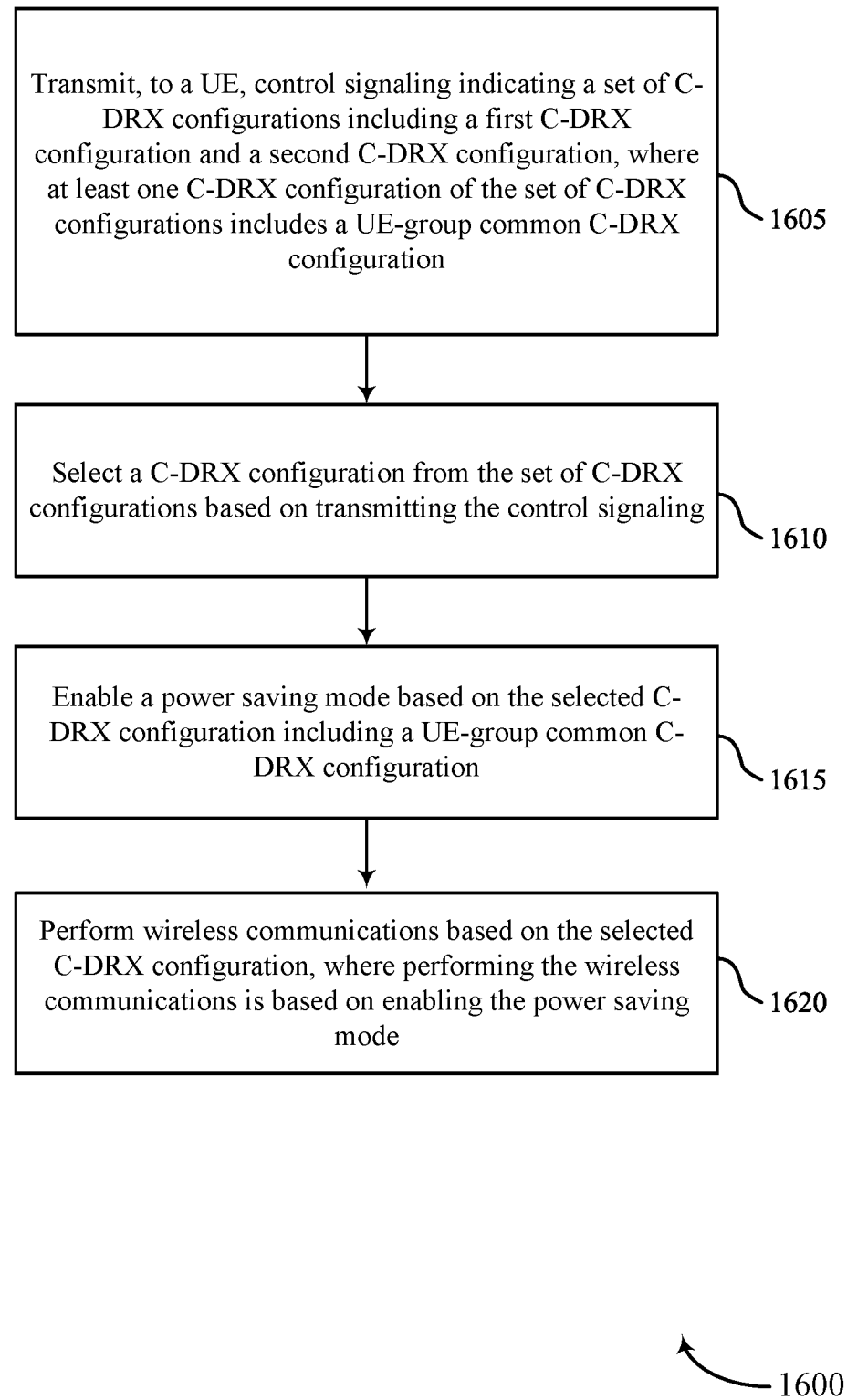

FIG. 16 shows a flowchart illustrating a method 1600 that supports techniques for wireless communication in C-DRX mode in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, control signaling indicating a set of C-DRX configurations including a first C-DRX configuration and a second C-DRX configuration, where at least one C-DRX configuration of the set of C-DRX configurations includes a UE-group common C-DRX configuration. The operations of 1605 may be performed in accordance with examples as disclosed herein. In some examples, aspects of the operations of 1605 may be performed by a transmission component 1125 as described with reference to FIG. 11.

At 1610, the method may include selecting a C-DRX configuration from the set of C-DRX configurations based on transmitting the control signaling. The operations of 1610 may be performed in accordance with examples as disclosed herein. In some examples, aspects of the operations of 1610 may be performed by a selection component 1130 as described with reference to FIG. 11.

At 1615, the method may include enabling a power saving mode based on the selected C-DRX configuration including a UE-group common C-DRX configuration. The operations of 1615 may be performed in accordance with examples as disclosed herein. In some examples, aspects of the operations of 1615 may be performed by a power component 1140 as described with reference to FIG. 11.

At 1620, the method may include performing the wireless communication based on the selected C-DRX configuration, where performing the wireless communication is based on enabling the power saving mode. The operations of 1620 may be performed in accordance with examples as disclosed herein. In some examples, aspects of the operations of 1620 may be performed by a communication component 1135 as described with reference to FIG. 11.

The following provides an overview of aspects of the present disclosure:

Aspect 1: A method for wireless communication at a UE, comprising: receiving, from a base station, control signaling indicating a set of C-DRX configurations comprising a first C-DRX configuration and a second C-DRX configuration, wherein at least one C-DRX configuration of the set of C-DRX configurations comprises a UE-group common C-DRX configuration; selecting a C-DRX configuration from the set of C-DRX configurations based at least in part on receiving the control signaling; and performing the wireless communication based at least in part on the selected C-DRX configuration.

Aspect 2: The method of aspect 1, further comprising: transmitting information associated with a capability of the UE to select between different C-DRX configurations, wherein receiving the control signaling is based at least in part on transmitting the information.

Aspect 3: The method of any of aspects 1 through 2, further comprising: receiving an indication of the C-DRX configuration from the set of C-DRX configurations for use by the UE, wherein selecting the C-DRX configuration from the set of C-DRX configurations is based at least in part on receiving the indication.

Aspect 4: The method of aspect 3, wherein receiving the indication comprises: receiving DCI that includes the indication, wherein the DCI comprises a UE-group DCI.

Aspect 5: The method of aspect 4, wherein the DCI comprises timing information indicating a period between receiving the DCI and enabling the C-DRX configuration.

Aspect 6: The method of any of aspects 3 through 5, wherein receiving the indication comprises: receiving a MAC-CE that includes the indication.

Aspect 7: The method of aspect 6, wherein the MAC-CE comprises timing information indicating a period between receiving DCI and enabling the C-DRX configuration.

Aspect 8: The method of any of aspects 3 through 7, further comprising: switching from a default C-DRX configuration to the selected C-DRX configuration based at least in part on receiving the indication, wherein performing the wireless communication is based at least in part on switching from the default C-DRX configuration to the selected C-DRX configuration.

Aspect 9: The method of aspect 8, wherein the default C-DRX configuration comprises a UE-specific C-DRX configuration and the selected C-DRX configuration comprises a UE-group common C-DRX configuration.

Aspect 10: The method of any of aspects 8 through 9, wherein the default C-DRX configuration corresponds to a normal operating mode of the base station or a power saving mode of the base station.

Aspect 11: The method of any of aspects 8 through 10, wherein the default C-DRX configuration is associated with a unique identifier.

Aspect 12: The method of any of aspects 1 through 11, further comprising: enabling a power saving mode based at least in part on the selected C-DRX configuration comprising a UE-group common C-DRX configuration, wherein performing the wireless communication is based at least in part on enabling the power saving mode.

Aspect 13: The method of any of aspects 1 through 12, wherein receiving the control signaling comprises: receiving an RRC message indicating the set of C-DRX configurations, wherein the set of C-DRX configurations comprises a plurality of UE-group common C-DRX configurations.

Aspect 14: The method of aspect 13, wherein each UE-group common C-DRX configuration of the plurality of UE-group common C-DRX configurations corresponds to a separate power mode.

Aspect 15: The method of any of aspects 1 through 14, wherein the first C-DRX configuration comprises a UE-specific discontinuous reception configuration; and the second C-DRX configuration comprises the UE-group common C-DRX configuration.

Aspect 16: A method for wireless communication at a base station, comprising: transmitting, to a UE, control signaling indicating a set of C-DRX configurations comprising a first C-DRX configuration and a second C-DRX configuration, wherein at least one C-DRX configuration of the set of C-DRX configurations comprises a UE-group common C-DRX configuration; selecting a C-DRX configuration from the set of C-DRX configurations based at least in part on transmitting the control signaling; and performing the wireless communication based at least in part on the selected C-DRX configuration.

Aspect 17: The method of aspect 16, further comprising: transmitting information associated with a capability of the UE to select between different C-DRX configurations, wherein transmitting the control signaling is based at least in part on transmitting the information.

Aspect 18: The method of any of aspects 16 through 17, further comprising: transmitting an indication of the C-DRX configuration of the set of C-DRX configurations for use by the UE.

Aspect 19: The method of aspect 18, wherein transmitting the indication comprises: transmitting DCI that includes the indication, wherein the DCI comprises a UE-group DCI.

Aspect 20: The method of aspect 19, wherein the DCI comprises timing information indicating a period between transmitting the DCI and enabling the C-DRX configuration.

Aspect 21: The method of any of aspects 18 through 20, wherein transmitting the indication comprises: transmitting a MAC-CE that includes the indication.

Aspect 22: The method of aspect 21, wherein the MAC-CE comprises timing information indicating a period between transmitting DCI and enabling the C-DRX configuration.

Aspect 23: The method of any of aspects 18 through 22, further comprising: switching from a default C-DRX configuration to the selected C-DRX configuration based at least in part on transmitting the indication, wherein performing the wireless communication is based at least in part on switching from the default C-DRX configuration to the selected C-DRX configuration.

Aspect 24: The method of aspect 23, wherein the default C-DRX configuration comprises a UE-specific C-DRX configuration and the selected C-DRX configuration comprises a UE-group common C-DRX configuration.

Aspect 25: The method of any of aspects 16 through 24, further comprising: enabling a power saving mode based at least in part on the selected C-DRX configuration comprising a UE-group common C-DRX configuration, wherein performing the wireless communication is based at least in part on enabling the power saving mode.

Aspect 26: The method of any of aspects 16 through 25, wherein transmitting the control signaling comprises: transmitting an RRC message indicating the set of C-DRX configurations, wherein the set of C-DRX configurations comprises a plurality of UE-group common C-DRX configurations.

Aspect 27: The method of aspect 26, wherein each UE-group common C-DRX configuration of the plurality of UE-group common C-DRX configurations corresponds to a separate power mode.

Aspect 28: The method of any of aspects 16 through 27, wherein the first C-DRX configuration comprises a UE-specific discontinuous reception configuration; and the second C-DRX configuration comprises the UE-group common C-DRX configuration.

Aspect 29: An apparatus for wireless communication at a UE, comprising a processor; memory coupled with the processor; and instructions stored in the memory and executable by the processor to cause the apparatus to perform a method of any of aspects 1 through 15.

Aspect 30: An apparatus for wireless communication at a UE, comprising at least one means for performing a method of any of aspects 1 through 15.

Aspect 31: A non-transitory computer-readable medium storing code for wireless communication at a UE, the code comprising instructions executable by a processor to perform a method of any of aspects 1 through 15.

Aspect 32: An apparatus for wireless communication at a base station, comprising a processor; memory coupled with the processor; and instructions stored in the memory and executable by the processor to cause the apparatus to perform a method of any of aspects 16 through 28.

Aspect 33: An apparatus for wireless communication at a base station, comprising at least one means for performing a method of any of aspects 16 through 28.

Aspect 34: A non-transitory computer-readable medium storing code for wireless communication at a base station, the code comprising instructions executable by a processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a network entity, control signaling indicating a set of connected discontinuous reception configurations comprising a first connected discontinuous reception configuration and a second connected discontinuous reception configuration, wherein the connected discontinuous reception configurations of the set of connected discontinuous reception configurations correspond to a discontinuous transmission configuration at the network entity;
   selecting a connected discontinuous reception configuration from the set of connected discontinuous reception configurations based at least in part on receiving the control signaling; and
   performing the wireless communication based at least in part on the selected connected discontinuous reception configuration.

2. The method of claim 1, further comprising:
   transmitting information associated with a capability of the UE to select between different connected discontinuous reception configurations,
   wherein receiving the control signaling is based at least in part on transmitting the information.

3. The method of claim 1, further comprising:
   receiving an indication of the connected discontinuous reception configuration from the set of connected discontinuous reception configurations for use by the UE,
   wherein selecting the connected discontinuous reception configuration from the set of connected discontinuous reception configurations is based at least in part on receiving the indication.

4. The method of claim 3, wherein receiving the indication comprises:
   receiving downlink control information that includes the indication, wherein the downlink control information comprises a UE-group downlink control information.

5. The method of claim 4, wherein the downlink control information comprises timing information indicating a period between receiving the downlink control information and enabling the connected discontinuous reception configuration.

6. The method of claim 3, wherein receiving the indication comprises:
   receiving a medium access control-control element that includes the indication.

7. The method of claim 6, wherein the medium access control-control element comprises timing information indicating a period between receiving the medium access control-control element and enabling the connected discontinuous reception configuration.

8. The method of claim 3, further comprising:
   switching from a default connected discontinuous reception configuration to the selected connected discontinuous reception configuration based at least in part on receiving the indication,
   wherein performing the wireless communication is based at least in part on switching from the default connected discontinuous reception configuration to the selected connected discontinuous reception configuration.

9. The method of claim 8, wherein the default connected discontinuous reception configuration comprises a UE-specific connected discontinuous reception configuration and the selected connected discontinuous reception configuration comprises a UE-group common connected discontinuous reception configuration.

10. The method of claim 8, wherein the default connected discontinuous reception configuration corresponds to a normal operating mode of the network entity or a power saving mode of the network entity.

11. The method of claim 8, wherein the default connected discontinuous reception configuration is associated with a unique identifier.

12. The method of claim 1, further comprising:
   enabling a power saving mode based at least in part on the selected connected discontinuous reception configuration comprising a UE-group common connected discontinuous reception configuration,
   wherein performing the wireless communication is based at least in part on enabling the power saving mode.

13. The method of claim 1, wherein receiving the control signaling comprises:
   receiving a radio resource control message indicating the set of connected discontinuous reception configurations,
   wherein the set of connected discontinuous reception configurations comprises a plurality of UE-group common connected discontinuous reception configurations.

14. The method of claim 13, wherein each UE-group common connected discontinuous reception configuration of the plurality of UE-group common connected discontinuous reception configurations corresponds to a separate power mode of the network entity.

15. The method of claim 1, wherein:
the first connected discontinuous reception configuration comprises a UE-specific connected discontinuous reception configuration; and
the second connected discontinuous reception configuration comprises a UE-group common connected discontinuous reception configuration.

16. A method for wireless communication at a network entity, comprising:
transmitting, to a user equipment (UE), control signaling indicating a set of connected discontinuous reception configurations comprising a first connected discontinuous reception configuration and a second connected discontinuous reception configuration, wherein the connected discontinuous reception configurations of the set of connected discontinuous reception configurations correspond to a discontinuous transmission configuration at the network entity;
selecting a connected discontinuous reception configuration from the set of connected discontinuous reception configurations based at least in part on transmitting the control signaling; and
performing the wireless communication based at least in part on the selected connected discontinuous reception configuration.

17. The method of claim 16, further comprising:
transmitting information associated with a capability of the UE to select between different connected discontinuous reception configurations,
wherein transmitting the control signaling is based at least in part on transmitting the information.

18. The method of claim 16, further comprising:
transmitting an indication of the connected discontinuous reception configuration of the set of connected discontinuous reception configurations for use by the UE.

19. The method of claim 18, wherein transmitting the indication comprises:
transmitting downlink control information that includes the indication, wherein the downlink control information comprises a UE-group downlink control information.

20. The method of claim 19, wherein the downlink control information comprises timing information indicating a period between transmitting the downlink control information and enabling the connected discontinuous reception configuration.

21. The method of claim 18, wherein transmitting the indication comprises:
transmitting a medium access control-control element that includes the indication.

22. The method of claim 21, wherein the medium access control-control element comprises timing information indicating a period between transmitting the medium access control-control element and enabling the connected discontinuous reception configuration.

23. The method of claim 18, further comprising:
switching from a default connected discontinuous reception configuration to the selected connected discontinuous reception configuration based at least in part on transmitting the indication,
wherein performing the wireless communication is based at least in part on switching from the default connected discontinuous reception configuration to the selected connected discontinuous reception configuration.

24. The method of claim 23, wherein the default connected discontinuous reception configuration comprises a UE-specific connected discontinuous reception configuration and the selected connected discontinuous reception configuration comprises a UE-group common connected discontinuous reception configuration.

25. The method of claim 16, further comprising:
enabling a power saving mode based at least in part on the selected connected discontinuous reception configuration comprising a UE-group common connected discontinuous reception configuration,
wherein performing the wireless communication is based at least in part on enabling the power saving mode.

26. The method of claim 16, wherein transmitting the control signaling comprises:
transmitting a radio resource control message indicating the set of connected discontinuous reception configurations,
wherein the set of connected discontinuous reception configurations comprises a plurality of UE-group common connected discontinuous reception configurations.

27. The method of claim 26, wherein each UE-group common connected discontinuous reception configuration of the plurality of UE-group common connected discontinuous reception configurations corresponds to a separate power mode of the network entity.

28. The method of claim 16, wherein:
the first connected discontinuous reception configuration comprises a UE-specific connected discontinuous reception configuration; and
the second connected discontinuous reception configuration comprises a UE-group common connected discontinuous reception configuration.

29. An apparatus for wireless communication at a user equipment (UE), comprising:
a processor;
memory coupled with the processor; and
instructions stored in the memory and executable by the processor to cause the apparatus to:
receive, from a network entity, control signaling indicating a set of connected discontinuous reception configurations comprising a first connected discontinuous reception configuration and a second connected discontinuous reception configuration, wherein the connected discontinuous reception configurations of the set of connected discontinuous reception configurations correspond to a discontinuous transmission configuration at the network entity;
select a connected discontinuous reception configuration from the set of connected discontinuous reception configurations based at least in part on receiving the control signaling; and
perform the wireless communication based at least in part on the selected connected discontinuous reception configuration.

30. An apparatus for wireless communication at a network entity, comprising:
a processor;
memory coupled with the processor; and
instructions stored in the memory and executable by the processor to cause the apparatus to:
transmit, to a user equipment (UE), control signaling indicating a set of connected discontinuous reception configurations comprising a first connected discontinuous reception configuration and a second connected discontinuous reception configuration, wherein the connected discontinuous reception configurations of the set of connected discontinuous reception configurations correspond to a discontinuous transmission configuration at the network entity;

select a connected discontinuous reception configuration from the set of connected discontinuous reception configurations based at least in part on transmitting the control signaling; and perform the wireless communication based at least in part on the selected connected discontinuous reception configuration.

\* \* \* \* \*